United States Patent
Kohn et al.

(10) Patent No.: US 10,235,686 B2
(45) Date of Patent: Mar. 19, 2019

(54) SYSTEM FORECASTING AND IMPROVEMENT USING MEAN FIELD

(71) Applicant: Microsoft Technology Licensing, LLC, Redmond, WA (US)

(72) Inventors: Wolf Kohn, Seattle, WA (US); Zelda B. Zabinsky, Seattle, WA (US); Rekha Nanda, Redmond, WA (US); Yanfang Shen, Bellevue, WA (US); Michael Ehrenberg, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 677 days.

(21) Appl. No.: 14/528,563

(22) Filed: Oct. 30, 2014

(65) Prior Publication Data

US 2016/0125434 A1    May 5, 2016

(51) Int. Cl.
G06Q 30/02 (2012.01)
G06F 17/30 (2006.01)
G06Q 10/04 (2012.01)
G06Q 10/08 (2012.01)

(52) U.S. Cl.
CPC ... *G06Q 30/0202* (2013.01); *G06F 17/30318* (2013.01); *G06F 17/30946* (2013.01); *G06Q 10/04* (2013.01); *G06Q 10/087* (2013.01)

(58) Field of Classification Search
None
See application file for complete search history.

(56) References Cited

U.S. PATENT DOCUMENTS

| 4,897,811 | A |   | 1/1990  | Scofield |
|-----------|---|---|---------|----------|
| 5,287,267 | A | * | 2/1994  | Jayaraman ............ G06Q 10/06 705/28 |
| 5,303,328 | A |   | 4/1994  | Masui et al. |
| 5,412,256 | A |   | 5/1995  | Alspector et al. |
| 5,479,574 | A |   | 12/1995 | Glier et al. |
| 5,598,355 | A |   | 1/1997  | Derou et al. |
| 5,649,066 | A |   | 7/1997  | Lacher et al. |
| 6,020,782 | A |   | 2/2000  | Albert et al. |

(Continued)

FOREIGN PATENT DOCUMENTS

| EP | 1550964 |   | 7/2005 |   |
|----|---------|---|--------|---|
| WO | WO-2010004587 A2 | * | 1/2010 | ............ G06Q 10/00 |

(Continued)

OTHER PUBLICATIONS

Van Kampen, Tim J., Renzo Akkerman, and Dirk Pieter van Donk. "SKU classification: a literature review and conceptual framework." International Journal of Operations & Production Management 32.7 (2012): 850-876. (Year: 2012).*

(Continued)

*Primary Examiner* — Thomas L Mansfield
*Assistant Examiner* — Derick J Holzmacher
(74) *Attorney, Agent, or Firm* — Christopher J. Volkmann; Kelly, Holt & Christenson, PLLC

(57) ABSTRACT

A set of SKUs is divided into a plurality of different Mean Field clusters, and a tracker (or sensor) is identified for each cluster. Product decisions for each Mean Field cluster are generated based on the tracker (or sensor) and each Mean Field cluster is then deconstructed to obtain product decisions for individual SKUs in the Mean Field cluster.

17 Claims, 8 Drawing Sheets

(56) References Cited

U.S. PATENT DOCUMENTS

| | | | |
|---|---|---|---|
| 6,032,125 A | 2/2000 | Ando | |
| 6,144,945 A | 11/2000 | Garg et al. | |
| 6,151,582 A * | 11/2000 | Huang | G06Q 10/06 705/7.25 |
| 6,687,685 B1 | 2/2004 | Sadeghi et al. | |
| 7,020,869 B2 | 3/2006 | Abrari et al. | |
| 7,092,929 B1 * | 8/2006 | Dvorak | G06Q 10/087 705/28 |
| 7,149,649 B2 | 12/2006 | Haft et al. | |
| 7,184,965 B2 | 2/2007 | Fox et al. | |
| 7,379,781 B2 | 5/2008 | Treichler et al. | |
| 7,386,519 B1 * | 6/2008 | Delurgio | G06Q 10/04 705/400 |
| 7,552,066 B1 | 6/2009 | Landvater | |
| 7,657,470 B1 * | 2/2010 | Delurgio | G06Q 10/04 345/440 |
| 7,707,091 B1 | 4/2010 | Kauffman et al. | |
| 7,783,648 B2 * | 8/2010 | Bateni | G06Q 30/02 707/752 |
| 7,858,439 B2 | 12/2010 | Kim | |
| 7,877,286 B1 * | 1/2011 | Neal | G06Q 20/201 705/20 |
| 7,996,254 B2 * | 8/2011 | Bateni | G06Q 10/04 705/7.31 |
| 8,010,404 B1 * | 8/2011 | Wu | G06Q 30/02 705/1.1 |
| 8,069,127 B2 | 11/2011 | Taylor et al. | |
| 8,078,486 B1 | 12/2011 | McLean et al. | |
| 8,112,377 B2 | 2/2012 | Schmidt | |
| 8,140,362 B2 | 3/2012 | Deshpande et al. | |
| 8,140,381 B1 * | 3/2012 | Wu | G06Q 30/0206 705/7.35 |
| 8,160,984 B2 * | 4/2012 | Hunt | G06Q 20/0855 358/474 |
| 8,214,238 B1 * | 7/2012 | Fairfield | G06Q 10/063 705/7.11 |
| 8,234,155 B2 | 7/2012 | Malov et al. | |
| 8,245,191 B2 | 8/2012 | Hirose et al. | |
| 8,255,266 B1 | 8/2012 | Pang et al. | |
| 8,285,582 B2 * | 10/2012 | Bateni | G06Q 30/02 705/7.31 |
| 8,359,229 B2 * | 1/2013 | Bateni | G06Q 30/02 705/28 |
| 8,374,903 B2 | 2/2013 | Little | |
| 8,473,317 B2 | 6/2013 | Santoso et al. | |
| 8,589,439 B2 | 11/2013 | Coldicott et al. | |
| 8,600,787 B2 | 12/2013 | Fox et al. | |
| 8,667,428 B1 | 3/2014 | Latypov | |
| 8,667,430 B1 | 3/2014 | Latypov | |
| 8,726,266 B2 | 5/2014 | Gururaja et al. | |
| 8,726,286 B2 | 5/2014 | Gururaja et al. | |
| 8,738,421 B1 | 5/2014 | Ali | |
| 8,788,097 B2 | 7/2014 | Drees et al. | |
| 8,805,771 B2 | 8/2014 | Baudel et al. | |
| 8,838,469 B2 * | 9/2014 | Bottom | G06Q 10/0637 705/7.29 |
| 8,996,402 B2 | 3/2015 | Priyadarshan et al. | |
| 9,606,253 B2 | 3/2017 | Tonchia | |
| 9,727,675 B2 | 8/2017 | Liu et al. | |
| 2002/0138316 A1 | 9/2002 | Katz et al. | |
| 2003/0033180 A1 | 2/2003 | Shekar et al. | |
| 2003/0046139 A1 | 3/2003 | Beman et al. | |
| 2004/0254903 A1 | 12/2004 | Heckerman et al. | |
| 2005/0015264 A1 | 1/2005 | Mutchler | |
| 2005/0021316 A1 | 1/2005 | Bollobas et al. | |
| 2005/0102044 A1 | 5/2005 | Kohn et al. | |
| 2005/0165635 A1 | 7/2005 | Moessner | |
| 2006/0041463 A1 | 2/2006 | Yoshida et al. | |
| 2006/0167704 A1 | 7/2006 | Nicholls et al. | |
| 2006/0200333 A1 | 9/2006 | Dalal et al. | |
| 2007/0027745 A1 | 2/2007 | Ouimet | |
| 2007/0118421 A1 * | 5/2007 | Oku | G06Q 10/04 705/7.31 |
| 2008/0133310 A1 * | 6/2008 | Kim | G06Q 30/02 705/7.31 |
| 2008/0133313 A1 * | 6/2008 | Bateni | G06Q 10/04 705/7.31 |
| 2008/0154693 A1 * | 6/2008 | Bateni | G06Q 30/02 705/7.31 |
| 2008/0162248 A1 | 7/2008 | Vachon et al. | |
| 2008/0208719 A1 | 8/2008 | Sharma et al. | |
| 2008/0270331 A1 | 10/2008 | Taylor et al. | |
| 2009/0094006 A1 | 4/2009 | Laidig et al. | |
| 2009/0125375 A1 * | 5/2009 | Bateni | G06Q 10/04 705/7.31 |
| 2009/0157458 A1 | 6/2009 | Naganuma et al. | |
| 2009/0177520 A1 * | 7/2009 | Bateni | G06F 17/30572 705/7.31 |
| 2009/0327027 A1 | 12/2009 | Bateni et al. | |
| 2009/0327037 A1 * | 12/2009 | Ng | G06Q 30/0244 705/14.43 |
| 2010/0161364 A1 | 6/2010 | Lokowandt et al. | |
| 2010/0161365 A1 | 6/2010 | Lokowandt et al. | |
| 2010/0228604 A1 * | 9/2010 | Desai | G06Q 30/02 705/7.31 |
| 2010/0235225 A1 * | 9/2010 | Bateni | G06Q 30/02 705/7.31 |
| 2010/0306031 A1 * | 12/2010 | McCauley | G06Q 30/0201 705/7.29 |
| 2010/0318403 A1 * | 12/2010 | Bottom | G06Q 10/0637 705/7.36 |
| 2010/0318490 A1 | 12/2010 | Bouchard et al. | |
| 2011/0071857 A1 | 3/2011 | Malay et al. | |
| 2011/0082774 A1 | 4/2011 | Spearman | |
| 2011/0145030 A1 | 6/2011 | Allen | |
| 2011/0153386 A1 * | 6/2011 | Kim | G06Q 10/04 705/7.31 |
| 2011/0191139 A1 | 8/2011 | Hong et al. | |
| 2011/0208591 A1 | 8/2011 | Chen et al. | |
| 2011/0270646 A1 * | 11/2011 | Prasanna | G06Q 10/00 705/7.27 |
| 2012/0136822 A1 | 5/2012 | Selman | |
| 2012/0216243 A1 | 8/2012 | Gill et al. | |
| 2012/0239468 A1 | 9/2012 | Yerneni et al. | |
| 2012/0310939 A1 | 12/2012 | Lee et al. | |
| 2013/0024225 A1 | 1/2013 | Perry et al. | |
| 2013/0226839 A1 | 8/2013 | Archambeau et al. | |
| 2013/0346352 A1 * | 12/2013 | Tiwari | G06Q 30/00 706/46 |
| 2014/0024975 A1 | 1/2014 | Little et al. | |
| 2014/0047107 A1 | 2/2014 | Maturana et al. | |
| 2014/0058704 A1 | 2/2014 | Malov et al. | |
| 2014/0058794 A1 | 2/2014 | Malov et al. | |
| 2014/0122179 A1 * | 5/2014 | Chan | G06Q 30/0202 705/7.31 |
| 2014/0122180 A1 * | 5/2014 | Chan | G06Q 30/0202 705/7.31 |
| 2014/0240875 A1 | 9/2014 | Junker et al. | |
| 2014/0249875 A1 | 9/2014 | Junker et al. | |
| 2014/0278775 A1 * | 9/2014 | Chan | G06Q 30/0202 705/7.31 |
| 2014/0278778 A1 * | 9/2014 | Regan | G06Q 10/04 705/7.31 |
| 2014/0324766 A1 | 10/2014 | Alboszta et al. | |
| 2015/0058078 A1 | 2/2015 | Ehrenberg et al. | |
| 2015/0088606 A1 * | 3/2015 | Tyagi | G06Q 30/0202 705/7.31 |
| 2015/0134413 A1 * | 5/2015 | Deshpande | G06Q 30/0202 705/7.31 |
| 2015/0167989 A1 | 6/2015 | Matsuoka et al. | |
| 2015/0185343 A1 | 7/2015 | Tonchia | |
| 2015/0370228 A1 * | 12/2015 | Kohn | G06O 50/06 700/31 |
| 2015/0379449 A1 | 12/2015 | Gopinath et al. | |
| 2015/0379536 A1 | 12/2015 | Gopinath et al. | |
| 2016/0004972 A1 | 1/2016 | Alboszta et al. | |
| 2016/0125290 A1 * | 5/2016 | Kohn | G06N 5/02 706/45 |
| 2016/0125435 A1 * | 5/2016 | Kohn | G06Q 10/04 705/7.31 |

(56) References Cited

U.S. PATENT DOCUMENTS

2016/0217393 A1 7/2016 Yu et al.
2016/0307146 A1* 10/2016 Nanda .................. G06Q 10/087
2016/0328724 A1* 11/2016 Ray .................... G06Q 30/0202

FOREIGN PATENT DOCUMENTS

| WO | WO-2013086186 A2 * | 6/2013 | ............... G06N 7/02 |
| WO | WO-2013106123 A1 * | 7/2013 | ............. G06Q 10/04 |
| WO | 2014074116 A1 | 5/2014 | |

OTHER PUBLICATIONS

Huang, Chi-Fang, Yun-Shiow Chen, and Yun-Kung Chung. "An Autonomous Collaborative Forecasting System Implementation—The First Step towards Successful CPFR System." World Academy of Science, (2008): 1187-1196. (Year: 2008).*

Kang, Keang-Young. Development of an Assortment Planning Model for Fashion Sensitive Products. Diss. Virginia Tech, 1999. (Year: 1999).*

Liu, Haishan, and Dejing Dou. "Breaking the deadlock: simultaneously discovering attribute matching and cluster matching with multi-objective simulated annealing." OTM Confederated International Conferences "On the Move to Meaningful Internet Systems". Springer, Berlin, Heidelberg, 2011. (Year: 2011).*

Second Written Opinion for International Patent Application No. PCT/US2015/057432, dated Sep. 29, 2016, date of filing: Oct. 27, 2015, 5 pages.

International Preliminary Report on Patentability for International Patent Application No. PCT/US2015/057432, dated Feb. 8, 2017, filing date: Oct. 27, 2015, 6 pages.

Adlakha, et al., "Mean Field Equilibrium in Dynamic Games with Strategic Complementarities", in Operations Research, vol. 61, No. 4, Jul. 2013, 19 pages.

"Inventory Forecasting", Published on: Mar. 23, 2013 Available at: http.//www.syspro.com/resources/factsheets/inventory_forecasting_factsheet.pdf.

Huang, et al., "An Autonomous Collaborative Forecasting System Implementation—The First Step towards Successful CPFR System", In Proceedings of World Academy of Science: Engineering & Technology, vol. 2, Jun. 2008, 10 pages.

Hoover, Jim., "How to Track Forecast Accuracy to Guide Forecast Process Improvement", In Foresight: The International Journal of Applied Forecasting, Issue 14, Sep. 9, 2009, 9 pages.

Crosswell, James., "Forecasting in the Cloud", Published on: Dec. 22, 2013 Available at: http://www.skubrain.com//blog/2013/12/22/forecasting-in-the-cloud.

Varghese, et al., "A Meta Forecasting Methodology for Large Scale Inventory Systems with Intermittent Demand", In Proceedings of the Industrial Engineering Research Conference, Jan. 2009, 6 pages.

Kampen, et al., "SKU classification: A literature review and conceptual framework", In International Journal of Operations and Production Management, vol. 32, Issue 7, Jul. 2012, 23 pages.

Kang, Keang-Young ., "Development of an Assortment-Planning Model for Fashion-Sensitive Products", In Dissertation in doctorate of philosophy in clothing and textiles, Apr. 19, 1999, 44 pages.

"SKU Forecast", Retrieved on: Jun. 24, 2014 Available at: http://www.mospry.com/sku-forecast.

U.S. Appl. No. 14/010,077, Ehrenberg, et al., "Rule to Constraint Translator for Business Application", filed Aug. 26, 2013.

International Search Report and Written Opinion for International Application No. PCT/US2015/057432, dated Dec. 22, 2015, date of filing: Oct. 27, 2015, 10 pages.

"SAS® Forecasting for Midsize Business", Retrieved on: Oct. 16, 2014, available at: http://www.sas.com/content/dam/SAS/en_us/doc/factsheet/forecasting-smb-106008.pdf.

International Search Report and Written Opinion for International Application No. PCT/US2015/057914, dated Dec. 23, 2015, date of filing: Oct. 29, 2015, 9 pages.

Second Wratten Opinion for International Patent Application No. PCT/US2015/057914, dated Sep. 22, 2016, date of filing: Oct. 29, 2015, 5 pages.

"Defining Supply Chain Plans", Published on: Oct. 28, 2012, Available at: https://docs.oracle.com/cd/E18727_01/doc.121/e13358/T309464T309471.htm.

Armstrong, et al., "Ruie-Based Forecasting: Using Judgment in Time-Series Extrapolation", In Principles of Forecasting: A Handbook for Researchers and Practitioners, Jan. 1, 2001, 23 pages.

Adyaa, et al., "An Application of Rule-Based Forecasting to a Situation Lacking Domain Knowledge", In International Journal of Forecasting, vol. 16, Issue 4, Oct. 1, 2000, 6 pages.

Armstrong, et al., "Demand Forecasting: Evidence-based Methods", In Working Paper 24/05 of Monash University, Sep. 14, 2005, 18 pages.

Siegfried, "Model Reformulation and Solver Optimization", Published on: Jul. 2, 2012, Available at: http://www.icon-fet.eu/service/model-reformulation-and-solver-optimization.

Lardeux, et al., "Interleaved Alldifferent Constraints: CSP vs. SAT Approaches", In Artificial Intelligence: Methodology, Systems, and Applications, Sep. 4, 2008, 5 pages.

Yahalom, et al., "Constrained Anonymization of Production Data: A Constraint Satisfaction Problem Approach", In Proceedings of 7th VLDB Conference on Secure Data Management, Sep. 17, 2010, 13 pages.

Bessiere, et al., "A SAT-Based Version Space Algorithm for Acquiring Constraint Satisfaction Problems", In 16th European Conference on Machine Learning, Oct. 3, 2012, 12 pages.

Larrosa, et al., "Boosting Search with Variable Elimination in Constraint Optimization and Constraint Satisfaction Problems", In Journal of Constraints, vol. 8, Issue 3, Jul. 2003, 28 pages.

Leitner, et al., "Optimizing Problem Space Representations through Domain Multi-modeling", In 3rd International Workshop on Product Line Approaches in Software Engineering, Jun. 4, 2012, 4 pages.

Freytag, Johann Christoph, "A Rule-Based View of Query Optimization", In Proceedings of ACM SIGMOD International Conference on Management of Data, Dec. 1987, 8 pages.

Aberer, et al., "Rule-Based Generation of Logical Query Plans with Controlled Complexity", In Proceedings of Fifth International Conference on Deductive and Object-Oriented Databases, Dec. 8, 1997, 18 pages.

Abdelhalim, et al., "An Optimization Approach for Effective Formalized fUML Model Checking", In Proceedings of the 10th International Conference on Software Engineering and Formal Methods, Oct. 1, 2012, 15 pages.

U.S. Appl. No. 14/010,077 Office Action dated Jun. 25, 2015, 24 pages.

U.S. Appl. No. 14/010,077 Amendment dated Sep. 24, 2015, 19 pages.

U.S. Appl. No. 14/010,077 Final Office Action dated Nov. 25, 2015, 23 pages.

U.S. Appl. No. 14/010,077 Response and RCE filed Feb. 25, 2016, 24 pages.

U.S. Appl. No. 14/010,077 Non-Final Office Action dated Apr. 1, 2016, 26 pages.

U.S. Appl. No. 14/010,077 Amendment dated Jul. 1, 2016, 20 pages.

U.S. Appl. No. 14/010,077 Supplemental Amendment dated Aug. 1, 2016, 13 pages.

International Preliminary Report on Patentability for International Patent Application No. PCT/US2015/057914, dated Jan. 20, 2017, date of filing: Oct. 20, 2015, 6 pages.

Final Office Action for U.S. Appl. No. 14/010,077 dated Nov. 1, 2016, 25 pages.

Kohn, et al., "A Micro-Grid Distributed Intelligent Control and Management System", In IEEE Transactions on Smart Grid, vol. 6, Issue 6, Aug. 6, 2015, pp. 2964-2974.

"Non Final Office Action Issued in U.S. Appl. No. 14/689,451", dated Oct. 2, 2017, 30 Pages.

Amendment for U.S. Appl. No. 14/689,451 dated Dec. 28, 2017, 12 pages.

"Mean field theory", Retrieved from https://en.wikipedia.org/wiki/Mean_field_theory, Aug. 14, 2014, 1 Page.

(56) References Cited

OTHER PUBLICATIONS

"Final Office Acton issued in U.S. Appl. No. 14/689,451", dated Apr. 11, 2016, 32 Pages.
Peterson, et al., "A Mean Field Theory Learning Algorithm for Neural Networks", In Proceedings of Complex Systems, 1987, pp. 995-1019.
Barabasi, et al., "Mean-field theory for scale-free random networks", In Proceedings of Physica A: Statistical Mechanics and its Applications, 272(1-2), Oct. 1, 1999, pp. 173-187.
Saul, et al., "Mean Field Theory for Sigmoid Belief Networks", In Journal of Artificial Intelligence Research, vol. 4 Issue 1, Mar. 1, 1996, pp. 61-76.
Wiegerinck, "Variational approximations between Mean Field Theory and the Junction Tree Algorithm", In Proceedings of the Sixteenth conference on Uncertainty in artificial intelligence, Jun. 30, 2000, pp. 626-633.
"Non Final Office Action Issued in U.S. Appl. No. 14/940,939", dated Aug. 30, 2018, 36 Pages.

\* cited by examiner

SYSTEM FORECASTING AND IMPROVEMENT USING MEAN FIELD

BACKGROUND

Computer systems are currently in wide use. Many computer systems use models to generate actionable outputs.

By way of example, some computer systems include business systems. Business systems can include, for instance, customer relations management (CRM) systems, enterprise resource planning (ERP) systems, line-of-business (LOB) systems, among others. These types of systems sometimes attempt to model various processes and phenomena that occur in conducting the business of an organization that deploys the system.

Such models can be relatively complicated. For instance, some organizations may sell millions of different variations of different products. Each product can be represented by a stock keeping unit (SKU). By way of example, a department store may sell shoes. There may be hundreds of different styles of shoes, each of which comes in many different sizes, many different colors, etc.

It can be difficult to manage these large volume. Conventional dynamic programming and optimal control methods are often viewed as being impractical to solve such large scale problems. This can be especially true when items, such as SKUs, are not independent. These conventional methods are not scalable to large numbers of SKUs, because it is often impractical to construct and update correlation functions that represent the correlations between the different SKUs.

The discussion above is merely provided for general background information and is not intended to be used as an aid in determining the scope of the claimed subject matter.

SUMMARY

A set of SKUs is divided into a plurality of different Mean Field clusters, and a tracker (or sensor) is identified for each cluster. Product decisions for each Mean Field cluster are generated based on the tracker (or sensor) and each Mean Field cluster is then deconstructed to obtain product decisions for individual SKUs in the Mean Field cluster.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
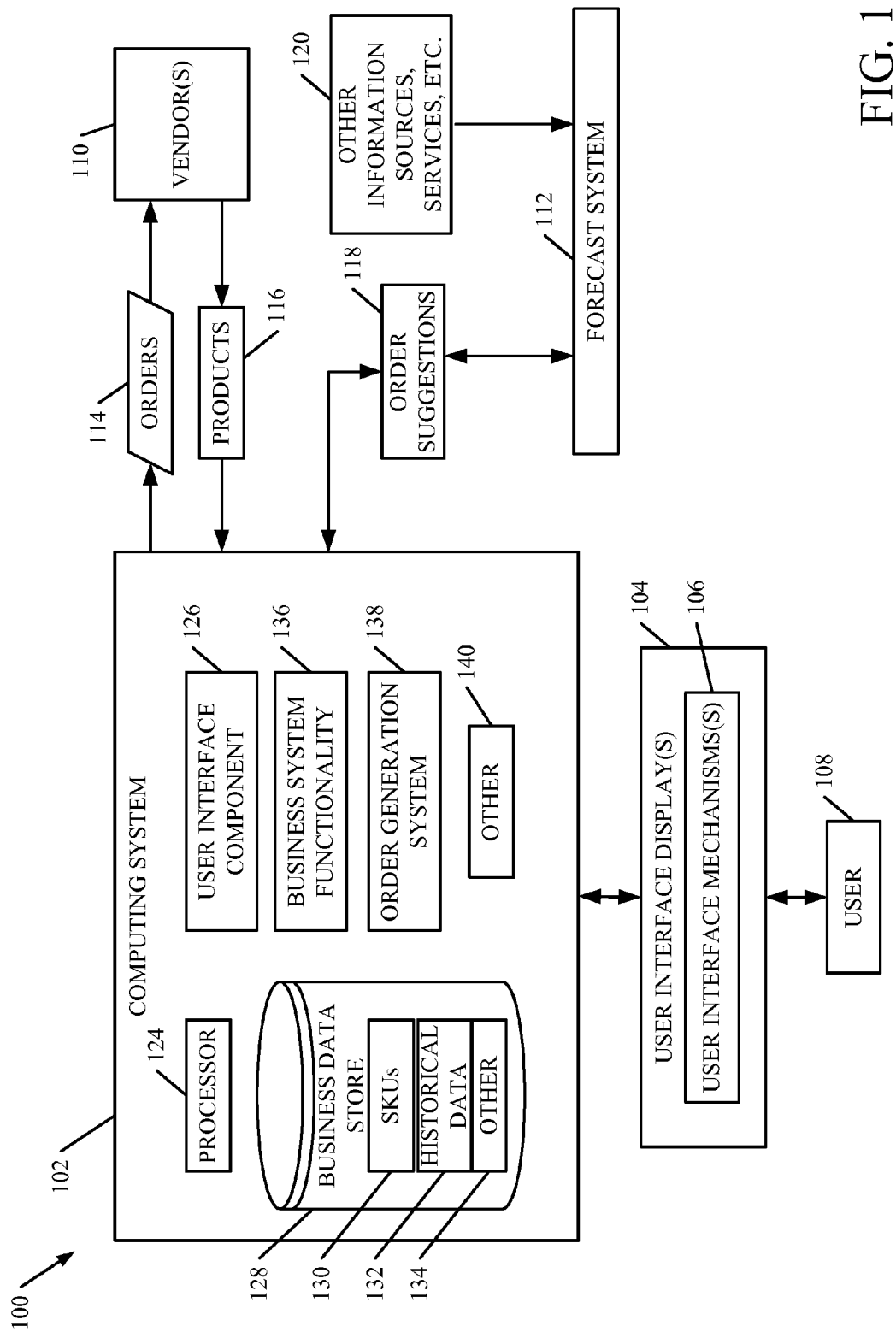
FIG. 1 is a block diagram of one example of a forecasting architecture.

FIG. 1 is a block diagram of one example of a forecasting architecture 100, deployed in conjunction with a business system 102. Business system 102 illustratively generates user interface displays 104 with user input mechanisms 106 for interaction by user 108. User 108 illustratively interacts with user input mechanisms 106 in order to control and manipulate business system 102, so that user 108 can perform his or her tasks or activities for the organization that uses business system 102.

Architecture 100 also illustratively shows that business system 102 communicates with one or more vendors 110 and can also communicate with forecast system 112. By way of example, business system 102 can generate and send orders 114 for various products 116, to vendors 110. Those vendors then illustratively send the products 116 to business system 102, where they are sold, consumed, or otherwise disposed of.

In the example shown in FIG. 1, business system 102 can receive order suggestions 118 from forecast system 112. In the example illustrated in FIG. 1, forecast system 112 illustratively obtains historical data from business system 102 and generates a model that can be used to generate forecasts, of different types, for use in providing order suggestions 118 to business system 102. It will be noted, of course, that order suggestions 118 are only one type of information that can be provided by forecast system 112. System 112 can provide other forecasts, of different types, for use in business system 102. It can provide demand forecasts, or a variety of other information that can be used by a wide variety of systems, such as inventory control systems, purchasing systems, assortment planning systems, among a wide variety of others.

In the example described herein, forecast system 112 illustratively generates a demand forecast (as is described in greater detail below) that can be used to suggest orders (in order suggestions 118) for business system 102. Business system 102 can use order suggestions 118 in generating purchase orders 114 for submission to vendors 110, in order to obtain products 116 that are used as inventory at business system 102.

FIG. 1 also shows that, in one example, forecast system 112 not only obtains information from business system 102 (such as historical sales information, etc.) but it can obtain other information from other sources or services 120. For example, where forecast system 112 is forecasting product demand, it may include weather forecast information from weather forecast sources or services. By way of example, it may be that the demand forecast for summer clothing may be influenced by the weather forecast or other information. In another example, it may be that vendors 110 only ship products on a periodic basis (such as on the 15$^{th}$ of the month, every other Tuesday, etc.). This information can also be obtained by forecast system 112 in order to identify a timing when orders should be placed. The timing can be output as part of order suggestions 118 as well. These are but two examples of the different types of information that can be considered by forecast system 112, and it can consider other types of information as well.

In the example shown in FIG. 1, business system 102 illustratively includes processor 124, user interface component 126, business data store 128 (which, itself, stores SKUs 130 that represent the various products used or sold by the organization that uses business system 102, as well time-indexed historical data 132 which, itself, can include demand information, inventory information, ordering information, receipt information, etc. and it can include other information 134 as well), business system functionality 136, order generation system 138, and it can include other items 140. Before describing one example of the operation of architecture 100 in more detail, a brief overview of some of the items shown in architecture 100 will first be provided.

In the example illustrated, business system functionality 136 is illustratively functionality employed by business system 102 that allows user 108 to perform his or her tasks or activities in conducting the business of the organization that uses system 102. For instance, where user 108 is a sales person, functionality 136 allows user 108 to perform workflows, processes, activities and tasks in order to conduct the sales business of the organization. The functionality can include applications that are run by an application component. The applications can be used to run processes and workflows in business system 102 and to generate various user interface displays 104 that assist user 108 in performing his or her activities or tasks.

Order generation system 136 illustratively provides functionality that allows user 108 to view the order suggestions 118 provided by forecast system 112 (along with any other information relevant to generating orders). It can also provide functionality so user 108 can generate purchase orders 114 based upon that information, or so the purchase orders 114 can be automatically generated.

Figure 2:
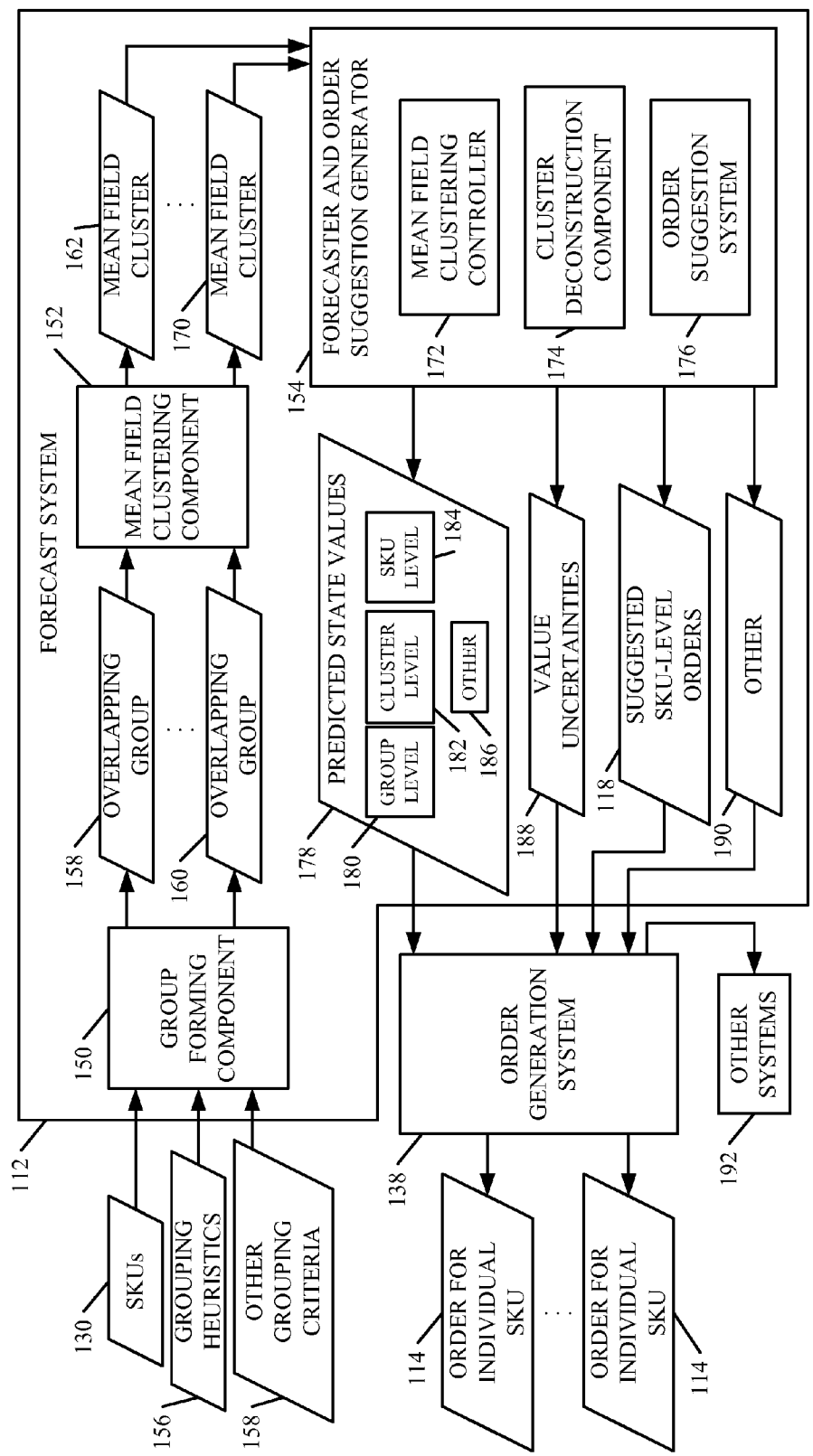
FIG. 2 is a block diagram showing one example of a forecast system (shown in FIG. 1) in more detail.

FIG. 2 is a block diagram showing one example of forecast system 112 in more detail. FIG. 2 shows that forecast system 112 illustratively includes group forming component 150, Mean Field clustering component 152 and forecaster and order suggestion generator 154. FIG. 2 also shows that, in one example, forecast system 112 illustratively receives SKUs 130 from business system 102. It can also receive a set of grouping heuristics, or rules, 156, and it can receive other grouping criteria 158. FIG. 2 also shows that forecaster and order suggestion generator 154 provides outputs to order generation system 138 where that information can be used (by system 138 and user 108) in order to generate a set of purchase orders 114 for individual SKUs.

Before describing the overall operation of forecast system 112 in more detail, a brief overview will first be provided. Group forming component 150 illustratively first divides the SKUs 130 into overlapping groups 158-160. Mean Field clustering component 152 divides the SKUs within the overlapping groups 158-160 into a set of Mean Field clusters 162-170 and provides them to forecaster and order suggestion generator 154. Forecaster and order suggestion generator 154 illustratively includes Mean Field cluster controller 172, cluster deconstruction component 174 and order suggestions system 176. Mean Field cluster controller 172 generates a set of decisions for a tracker (or sensor) representing each Mean Field cluster 162-170. Cluster deconstruction component 174 then deconstructs those decisions to generate a corresponding decision for each particle (or member) of the corresponding Mean Field cluster. This information is provided to order suggestion system 176 that generates suggested orders 118.

It will be noted that, in the example shown in FIG. 2, forecaster and order suggestion generator 154 can provide additional information as well. For instance, it can provide predicted state values 178 for the various controller states. These values can be at the group level 180, at the cluster level 182, at the individual SKU level 184, or at other levels 186. It can also provide value uncertainties 188, corresponding to the predicted state values 178. It can provide other information 190 as well.

The information is shown being provided to order generation system 138 for use in generating purchase orders 114. It will also be noted, of course, that the information can be provided to other systems 192. For instance, it can be stored in business data store 128 as additional historical data 132. It can be provided to other analysis systems for trend analysis, assortment planning, inventory control, or a wide variety of other systems as well.

Figure 3:
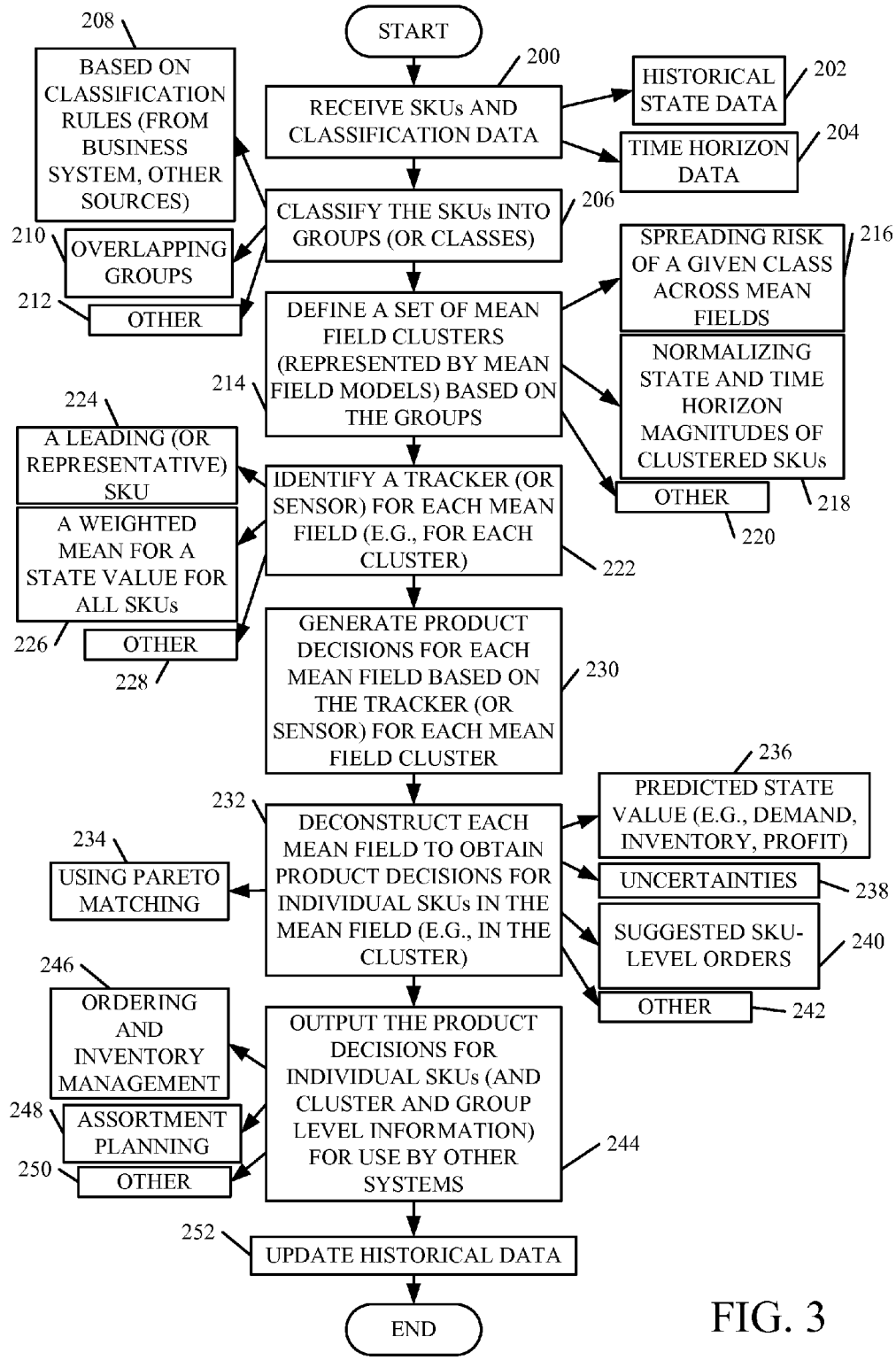
FIG. 3 is a flow diagram illustrating one example of the operation of the forecast system shown in FIG. 2.

FIG. 3 is a flow diagram illustrating one example of the operation of forecast system 112 in more detail. FIGS. 1-3 will now be described in conjunction with one another. It should also be noted that a more formal description of the operation of forecast system 112 is provided below.

Forecast system 112 first receives the set of SKUs 130, along with classification or grouping data (such as grouping heuristics 156 or other grouping criteria 158) from business system 102. This is indicated by block 200 in FIG. 3. The information can also include historical state data 202, as well as time horizon data 204. In one example, for instance, where forecast system 112 forecasts demand, it also considers inventory and profit. Thus, the state values that are received, per SKU, can include demand, demand uncertainty, inventory, inventory uncertainty, profit, profit uncertainty, and order information.

Group forming component 150 illustratively classifies the SKUs 130 into groups (or classes). This is indicated by block 206. This can be done using classification rules (which can be provided from business system 102 or other sources 120). This is indicated by block 208. The classification rules can be functions of the state values, the time horizon, or other variables used by group forming component (or classifier) 150. One example of rules that component 150 can use to classify SKUs 130 into groups 158-160 can include the range of average demand.

In one example, the groups are overlapping groups 210. For instance, the groups illustratively include SKU membership that overlaps along the edges between two adjacent groups (or classes). By way of example, component 150 can classify SKUs with average demand between 10 and 100 into one group 158, and SKUs with average demand between 90 and 200 into another group 160. Thus, the two groups have an overlap in membership. Component 150 can classify the SKUs in other ways as well, and this is indicated by block 212.

Mean Field clustering component 152 then defines a set of Mean Field clusters (which can be represented by Mean Field models) based upon the overlapping groups 158-160. In the example shown in FIG. 2, the clusters are represented by blocks 162-170. Defining the set of Mean Field clusters is indicated by block 214 in FIG. 3. The Mean Field clusters 162-170 contain SKUs that are measured as similar under a predetermined metric. For example, the weighted demand of the SKUs in each cluster may be similar.

It can thus be seen that each cluster 162-170 is a Mean Field which has its own Mean Field dynamics. Thus, a forecaster, controller, etc., that can be designed for a single SKU can be applied directly to each Mean Field.

Mean Fields are generated instead of simply processing groups 158-160 in order to spread the risk or uncertainty of each group 158-160 into multiple different Mean Fields. Spreading the risk in this way is indicated by block 216. As an example, if a group 158 represents all iced tea products and that group is defined directly as a Mean Field, then if the performance of the Mean Field dynamics is relatively poor for that group, a store that bases its purchase orders of iced tea on those dynamics may run out of all iced tea. However, if the SKUs for the iced tea products are spread into different Mean Field clusters 162-170, and each cluster is a Mean Field, then if the Mean Field dynamics for one cluster operates poorly, it does not cause the whole group, representing all iced tea products to suffer. For instance, by spreading the uncertainty in this way, a store using the Mean Field dynamics to generate purchase orders may run out of one or more brands of iced tea (those that have SKUs in the poorly performing Mean Field cluster), but there may still be other brands of iced tea available (those that have SKUs in a different Mean Field cluster). Thus, the risk of each group or class 158-160 is spread across multiple different Mean Fields 162-170.

In addition, in order to group SKUs from different overlapping groups 158-160 into a single Mean Field cluster (such as cluster 162) the information corresponding to the individual SKUs is illustratively normalized. For instance, the magnitude of the state and time horizon (or other variables) of the grouped SKUs are illustratively normalized. This is indicated by block 218. The set of Mean Field clusters can be defined in other ways as well, and this is indicated by block 220.

Mean Field clustering component 152 also illustratively identifies a tracker (or sensor) that represents each Mean Field cluster. This is indicated by block 222 in FIG. 3. By way of example, the sensor or tracker for each Mean Field can be a leading (or representative) SKU in Mean Field cluster that captures the performance of the membership of the Mean Field cluster relatively well. This is indicated by block 224. The tracker or sensor can also be a weighted mean for a state value for all SKUs in the Mean Field cluster. This is indicated by block 226. The tracker or sensor can be other values as well, and this is indicated by block 228.

A Mean Field cluster controller is then generated for each Mean Field cluster 162-170, and it is used to generate product decisions for each Mean Field, based upon the particular tracker, or sensor. This is indicated by block 230.

Cluster deconstruction component 174 then deconstructs each Mean Field cluster to obtain product decisions for the individual SKUs in the Mean Field cluster. This is indicated by block 232 in FIG. 3. In one example, cluster deconstruction component 174 employs pareto matching between the sensor or tracker representing the cluster and the individual members (or particles, e.g., the individual SKUs) in the cluster. This is indicated by block 234, and this is described in greater detail below with respect to FIGS. 4-6. In one example, the deconstruction transfers the decision made for a single Mean Field cluster into decisions made for the individual SKUs, in order to generate predicted state values (such as demand, inventory, profit, etc.). This is indicated by block 236. It can also generate the corresponding uncertainties 238. This information can be provided to order suggestion system 176 which generates suggested SKU-level orders 240. The deconstruction can include other items as well, and this is indicated by block 242.

Forecaster and order suggestion generator 154 outputs the product decisions for individual SKUs, and it can output corresponding information at the cluster or group level as well, for use by other systems. This is indicated by block 244 in FIG. 3. For instance, the information can be provided to ordering and inventory management systems, as indicated by block 246. It can be provided to assortment planning systems as indicated by block 248, or to other systems, as indicated by block 250.

The information is also used to update the historical data 132 in business system 102. This is indicated by block 252.

Figure 4:
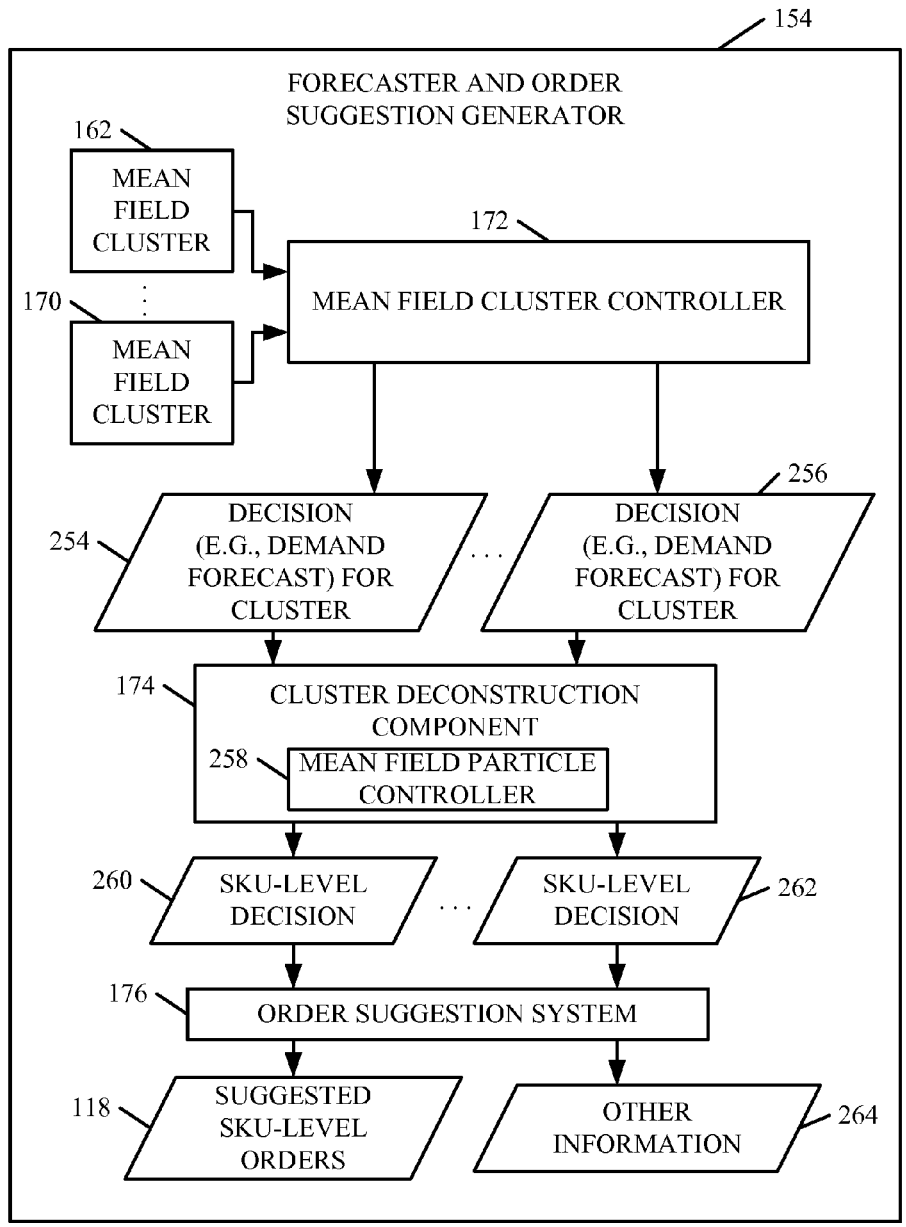
FIG. 4 is a block diagram showing one example of a demand forecaster and order suggestion generator (shown in FIG. 2) in more detail.
Figure 5:
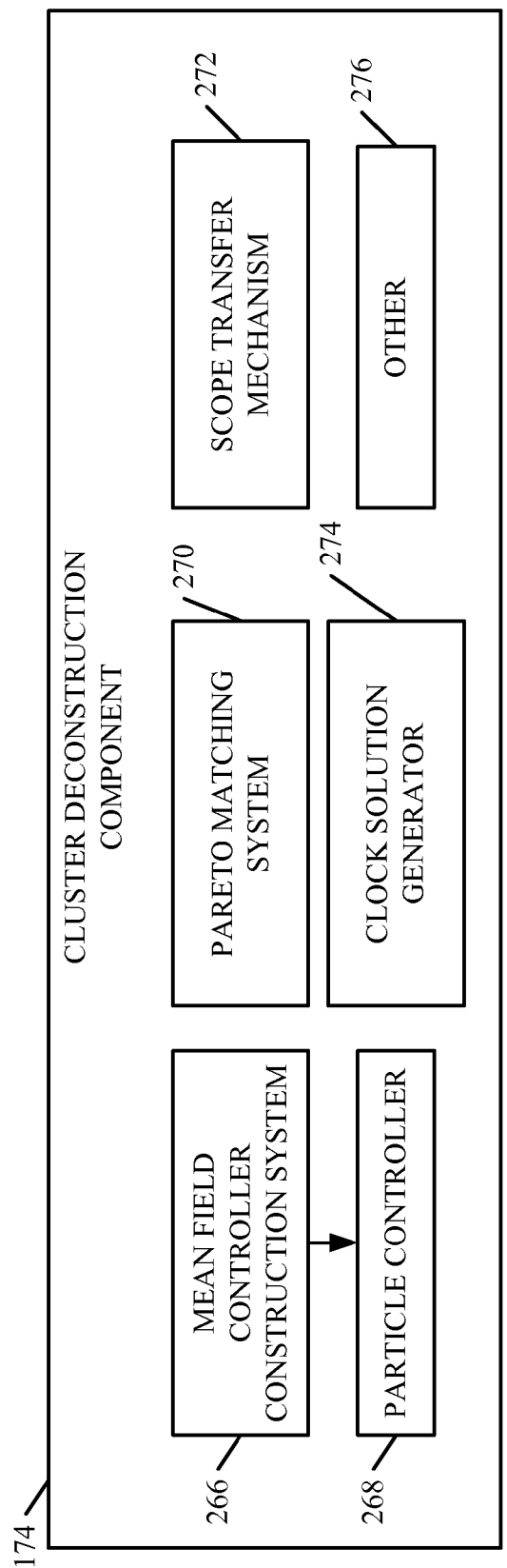
FIG. 5 is a block diagram showing one example of a cluster deconstruction component (shown in FIG. 3) in more detail.
Figure 6:
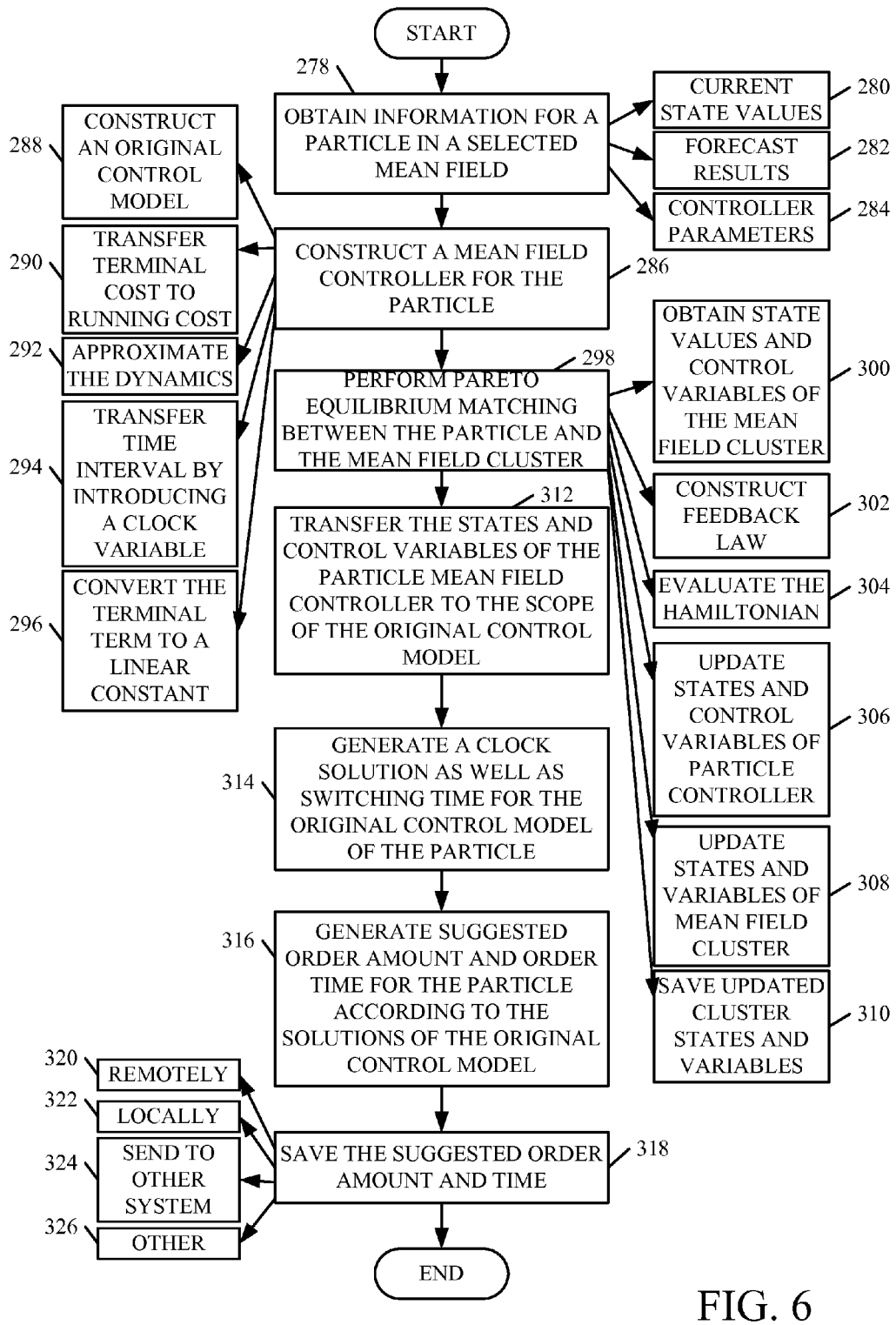
FIG. 6 is a flow diagram illustrating one example of the operation of the cluster deconstruction component shown in FIG. 5.

FIG. 4 shows the processing flow in forecaster and order suggestion generator 154 in more detail. FIG. 5 is a block diagram illustrating one example of cluster deconstruction component 174 in more detail. FIG. 6 is a flow diagram illustrating one example of the operation of cluster deconstruction component 174. FIGS. 4-6 will now be described in conjunction with one another.

It should also be noted that, with respect to FIG. 4, the computations can be distributed, such as in a cloud computing environment, or in another remote server environment. FIG. 4 shows that Mean Field cluster controller 172 first receives the Mean Field clusters 162-170. It generates decisions (e.g., demand forecasts) for each cluster. The decision for Mean Field cluster 162 is represented by block 254 in FIG. 4. The decision for cluster 170 is represented by block 256. The Mean Field cluster-level decisions are provided to cluster deconstruction component 174. It should be noted that, where the processing is distributed, a separate cluster deconstruction component 174 can be provided to process the decisions for each individual Mean Field cluster 162-170. Therefore, while cluster deconstruction component 174 is shown as a single component processing all of the decisions 154-156 for the different Mean Field clusters, it could be divided and distributed processing can be employed as well.

In any case, in one example, component 174 generates a Mean Field particle controller 258 that operates on a given decision (such as decision 254) for a Mean Field cluster and deconstructs that decision to obtain SKU-level decisions 260-262, for the individual SKUs in the cluster corresponding to decision 254 (i.e., for the individual SKUs in Mean Field cluster 162). Again, order suggestion system 176 can be distributed to generate suggested orders from each of the individual SKU-level decisions 260-262, and it is shown as a single system for the sake of example only. It illustratively outputs the suggested SKU-level orders 118, along with any other information 264.

FIG. 5 shows that, in one example, cluster deconstruction component 174 includes a Mean Field controller construction system 256 that generates particle controllers 268 to process the information for the individual particles in a Mean Field cluster. Component 174 also illustratively includes a pareto matching system 270 that generates states and control variable values for the individual particles in the Mean Field cluster. It can include scope transfer mechanism 272 that transfers the states and control variables of the particle Mean Field controller 268 to a scope of an original control model, and clock solution generator 274 that generates a clock solution, and switching times, for the original control model of the particle. It can include other items 276 as well.

FIG. 6 shows that cluster deconstruction component 174 first obtains information for a particle in a selected Mean Field. This is indicated by block 278. The information can include current state values 280, forecast results 282, and controller parameters 284. The forecast results 282 illustratively include predicted demand, inventory, etc. which were decomposed from the forecast results of the group that contained the particle. The controller parameters 284 can be generated using off-line training mechanisms, or in other ways.

Mean Field controller construction system 266 then constructs a Mean Field controller for the particle. This is indicated by block 286. In doing this, system 266 can construct an original control model for the particle, as indicated by block 288. It can then transfer the terminal cost in the criterion to a running cost as indicated by block 290. It can then approximate the dynamics of the Mean Field particle, as indicated by block 292. It can also transform the time interval to a fixed time interval (such as between 0 and 1) by introducing a clock variable, as indicated by block 294, and it can then convert the terminal term to a linear constant as indicated by block 296.

Once the particle Mean Field controller 268 is constructed, pareto matching system 270 illustratively performs pareto equilibrium matching between the particle and the Mean Field cluster. This is indicated by block 298. In doing so, it first illustratively obtains state values and control variables for the Mean Field cluster. This is indicated by block 300. It then constructs a feedback law for the particle Mean Field controller 268 (with the controls of the Mean Field cluster as an extra input). This is indicated by block 302. It then evaluates a Hamiltonian with respect to the feedback law, as indicated by block 304. It then updates the states and control variables of the particle Mean Field controller 268. This is indicated by block 306. It then updates the states and the control variables of the Mean Field cluster (with the control variables of the particle Mean Field controller as an extra input). This is indicated by block 308. Finally, it saves the updated cluster states and variables as indicated by block 310. They can be saved locally, or to a cloud or other remote server environment, etc.

Scope transfer mechanism 272 then transfers the states and control variables of the particle Mean Field controller 268 to the scope of the original control model generated for the particle at block 288. Transferring the states and control variables is indicated by block 312 in FIG. 6.

Clock solution generator 274 then generates a clock solution as well as switching time for the original control model of the particle (again as constructed at block 288). This is indicated by block 314. The order suggestion system 176 then generates a suggested order amount and order time for the particle according to the solutions of the original control model. This is indicated by block 316. The suggested order amount and time are then saved. This is indicated by block 318. For instance, they can be saved to a cloud or remote server environment as indicated by block 320. They can also, or in the alternative, be saved locally, as indicated by block 322. They can be sent to other systems, such as business system 102. This is indicated by block 324. They can be saved or sent other places as well, and this is indicated by block 326.

It can thus be seen that the Mean Field-based forecast system can be used to accommodate large scale forecasting and optimization. It operates in polynomic time and allows distributed computation. This improves the operation of the forecasting system, itself. Because it operates in polynomic time and can be processed in distributed computing environments, it makes the calculation of the forecast and optimizations much more efficient. It also preserves critical information at the individual SKU level, but uses aggregate Mean Field information to allow the business system 102 to generate overall trends and insight into the operations of the organization that employs business system 102. It can be used in assortment planning, inventory management and price optimization, among other places. The scalability to large data sets improves the operation of the business system as well, because it can obtain more accurate forecasting, assortment planning, inventory management, etc., and it can obtain this accurate information much more quickly.

A more formal description of forecast system 112 will now be provided.

It is first worth noting that the Mean Field model is applicable to systems with real-time or near real-time data, with sizes ranging from small data sets to very large data sets. The Mean Field model provides a practical and scalable method. It avoids the computation of correlation functions by associating individual particles with a Mean Field particle.

Instead of finding the interactions between all particles, the interaction of each particle is with respect to the Mean Field Particle. The entropy after interaction is maximized (that is, no further information can be extracted), which is also referred to above as Pareto equilibrium. The interaction between any two particles is determined through each one's interaction with the Mean Field. Mean Field depends on time (it reflects dynamic property of the original system), and the Mean Field Particle is propagated through time. Any time a single particle changes, it makes a change to the Mean Field Particle. The methodology involves many integrations that are performed numerically. They can be performed, for example, with the Runge-Kutta 3rd order method, and the modified Rosenbrock method.

The Mean Field model is applicable to many types of systems. Table 1 below shows examples of state variables for several example systems, including inventory management, and assortment planning.

TABLE 1

| States for inventory management example (per SKU) | States for assortment planning example (per SKU) | Mean Field states that connect each single SKU to other SKUs through the Mean Field |
| --- | --- | --- |
| Demand | Demand | Field capital (K) |
| Profit | Revenue, | Field capacity |
| Inventory | opportunity cost | Field demand |
| Spoilage | Inventory | Field opportunity cost |
| Order | Capacity | Field/Target profit |
| These states include the expected value and standard deviation. The uncertainties of the states are captured in a probability space. | (volume/mass) Capital (K) Order | (associated with revenue) |

Markov processes can be generated using a set based function as the fundamental Kernel (or called the fundamental propagator) of the Markov chain, that is, $\mu(x(t) \subseteq X_t \subseteq \mathfrak{R} | x(t_m), t_m)$ and $X_t$ is a Borel set, so $x(t)$ is a set (instead of a singleton $x(t) \in \mathfrak{R}$). The fundamental propagator uses one time memory, $P_{1|1}(x,t|x_m,t_m)$. The systems under control (for example, assortment planning processes) are not stationary Markov Chains, and are not homogeneous, so the approach conditions on $x_m, t_m$, and the states are modeled with probabilities. There are single particle states (for example, single SKUs), and a Mean Field particle state, which are propagated. The approach can apply the Pareto equilibrium to connect the two propagators. For example, the Pareto equilibrium between an SKU propagator and the Field propagator replaces the need to compute the correlation between SKUs.

As an example, the Mean Field Markov model for an assortment planning system, with an uncertainty propagation can include: actions per SKU (random variables):
Quality (function of demand and inventory),
Time (time to the next order);
Chapman Kolmogorov Propagator;
one time memory as a fundamental propagator $P_{1|1}(x,t|x',t')=T(x,t|x',t')$, that is, the probability at time t will have x quantity given at time t' it has x'. The approach discovers $T(x,t|x',t')$ which provides enough information to construct $P_m(x_m,t_m|x_1,t_1, \ldots, x_{m-1},t_{m-1})$; and the algorithm for propagation uses a differential form, $$\frac{\partial T(x,t|x',t')}{\partial t} = \mathcal{A}(t)T(x,t|x',t').$$

Each problem needs to determine the operator $\mathcal{A}(t)$. To propagate any function $\rho(x)$, the operator $\mathcal{A}(t)$ satisfies, $$\mathcal{A}(t)\rho(x) = \lim_{\Delta t \to 0} \frac{1}{\Delta t}\int dx'(T(x,t+\Delta t|x',t') - T(x,t|x',t'))\rho(x'). \quad \text{Eq. 1}$$

It is much easier to build $\mathcal{A}(t)$ than to find $T(x,t|x',t')$.

The construction of $\mathcal{A}(t)$ is related to rules. It is assumed there is enough data to build $\mathcal{A}(t)$. For example, the probability propagator of a deterministic process is $$\dot{x} = g(x(t))$$

$$x(t) \in R^n$$

$$x(t_0) = x_0 \quad \text{Eq. 2}$$

Assume g(x(t)) satisfies the Lipschitz condition, that is, $\|g(y)-g(x)\| \le K\|y-x\|$. Let $\varphi_t(x_0)$ be the solution of the differential equation. It must satisfy the following conditions:

$$\varphi_{t+t'}(x) = \varphi_t(\varphi_{t'}(x)) \quad \text{Eq. 3}$$

$$\varphi_{t_0}(x_0) = x_0$$

$$\frac{d\varphi_t}{dt} = \dot{\varphi}_t = g(\varphi_t)$$

Note that if g(x(t)) is a linear equation, $\varphi_t^{-1}$ always exists. But it is not true in the present case. Therefore a repair function does not exist. For a general deterministic process as above, the operator $$\mathcal{A} = \frac{\partial}{\partial x}g(x).$$

Therefore the associated differential Chapman Kolmogorov equation is $$\frac{\partial T(x,t|x',t')}{\partial t} = \frac{\partial}{\partial x}g(x)T(x,t|x',t') \quad \text{Eq. 4}$$

Generating a distribution from the rules allows propagation to any time in the future.

As another example, for a jump process propagator (predictable jumps), consider predictable jumps (such as demand jumps triggered by rules and events). Let $W(x|x',t)\Delta t$ be the probability density function for a jump from x' to x at some time in the time interval $[t,t+\Delta t]$ (note at the beginning of the time interval it is x'). Define $\Gamma(x',t)=\int dx W(x|x',t)$ (that is, integration over all possible jumps). A differential equation with jumps requires:

$$\frac{\partial}{\partial t}T(x,t|x',t') = \quad \text{Eq. 5}$$

$$\int dx''[W(x|x'',t)T(x'',t|x',t') - W(x''|x,t)T(x,t|x',t')]$$

(Inside the integration, the first part is the probability with a jump, the second part is the probability without a jump).

To construct a Mean Field pareto problem for the example of assortment planning, the Mean Field approach will include a forecaster and tracker. The Mean Field approach incorporates interactions between SKUs in a practical and scalable manner, using parallelization and distributed computing.

The Mean Field aggregation has a taxonomy to classify SKUs that are similar in a specific sense. To make an analogy, in real-time trading, investments are grouped by sector, such as energy sector, technology sector, etc., and when one sector increases, most of the investments in that sector also increase. The Mean Field approach applied to assortment planning also uses a classification system to group SKUs.

The SKUs can be classified, for example, according to: 1. Point-of-sale (POS) velocity, that is, rate of change in sales; 2. volume in the store, that is related to capacity; or 3. opportunity cost, among others. An optimization problem combined with statistical analyses is used to discover a useful classification, and to generate rules for classifying SKUs. Sensors (observable metrics) are created to update the classification scheme to achieve good performance.

A Mean Field forecaster and Mean Field tracker work in continuous time instead of discrete time, because the Mean Field changes so quickly, it would be necessary to discretize at very small increments. When jumps occur (for example, orders occur at discrete epochs), the Mean Field approach captures the effect of discrete changes, but the computation is efficient because the probability propagates continuously in time.

The mapping between Mean Field and individual SKU and the mapping between two Mean Fields (of different classifications) is done by constructing Pareto optimality and determining a Pareto equilibrium. The mapping provides a methodology to transfer Mean Field visual orders into individual SKU orders.

The criterion for the Mean Field is expressed as $J(v,p(x,t))$, where v is the order rate, and p(x,t) is the probability density.

In the Mean Field approach, the mean of the Mean Field, z(t), is determined by integrating over the probability density, which is a control variable in the optimization problem, and is time-varying. In a standard stochastic process, the process itself changes with time, and the probability density is adapted for each time instance. The Mean Field, in general, and for assortment planning in particular, is not a stationary (ergodic) process. In an ergodic process, the sampled mean and the cluster mean are the same, but this is not the case in assortment planning.

An example of the Mean Field LQ tracking criterion is given by:

$$J(v, p) \int_0^T \frac{1}{2}(x(t) - z(t))^T Q(x(t) - z(t)) + \qquad \text{Eq. 6}$$

$$\frac{1}{2} v^T(t) R v(t) dt + \frac{1}{2} x^T(T) F x(T) + x^T(T) H$$

with $$z(t) = \int_{\text{cluster space},K} \zeta p(\zeta, t) d\zeta \text{ where } K \subset \mathbb{R}^n \qquad \text{Eq. 7}$$

In the Mean Field tracking formulation, the Mean Field target is the expected value over the probability density (which is unknown, and found in the optimization).

The Mean Field tracker is an optimization problem over the space of controls (for example, orders), v, and the probability density, p(x,t), with the criterion $$J(v, p) = \int_0^T \frac{1}{2}\left(x(t) - \int_0^t \zeta p(\zeta, t) d\zeta\right)^T Q\left(x(t) - \int_0^t \zeta p(\zeta, t) d\zeta\right) + \qquad \text{Eq. 8}$$

$$\frac{1}{2} v^T(t) R v(t) dt + \frac{1}{2} x^T(T) F x(T) + x^T(T) H$$

and with constraints $$\dot{x}(t) = A(u)x(t) + Bv(t) + f(t)$$

$$\dot{p}(x,t) = \mathcal{A}(x,t) p(x, t_0) \qquad \text{Eq. 9}$$

and where the operator $\mathcal{A}$ is defined by $$\mathcal{A}(x,t)\rho(x) = \int dx' [W(x|x',t)\rho(x') - W(x'|x,t)\rho(x)] \qquad \text{Eq. 10}$$

and W(x|x',t)Δt is the probability density function for a jump from x' to x at some time in time interval [t,t+Δt] (note at the beginning of the time interval it is x'). The probability density function W is calculated for the Mean Field, and the Mean Field probability density gets propagated to determine the optimal control.

If $$z(t) = \int_K \zeta p(\zeta, t) d\zeta$$

is known, then the optimal solution is expressed as, $$v^*(t) = G(t)x(t) + \Psi(t, z(t)) \qquad \text{Eq. 11}$$

where G(t) is called the gain. Since z(t) is unknown, due to the unknown probability density p, and then knowing the probability density, a sequential optimization approach is used.

Assume z(t) is known, and use the propagation equation to solve for the unknown probability density p(x,t), and then knowing the probability density, solve for z(t).

In short, the Mean Field probability density gets propagated and an optimal control is determined for the Mean Field. The optimality is in the Pareto sense, balancing objectives for example, profit, capital (K), capacity (C), and other objectives determined from the soft rules. The probability W(x|x',t), for example, for each SKU, is determined by playing a Pareto game with the Mean Field. This is a static game, and so the computation is manageable. The constraints for the game for an individual SKU can be based on empirical point-of-sale data and user rules. This approach makes the assortment planning problem scalable.

A summary of using the Mean Field approach for an assortment planning application will now be described. The controller operates on the Mean Field (that is, a group of SKUs). The methodology and algorithms to group SKUs into different Mean Fields is discussed above. The correlation between Mean Fields should illustratively not be orthogonal, that is, interactions between Mean Fields are illustratively necessary. An analogy of grouping SKUs to securitization, is to apply a similar idea used in credit card markets to handle debts. For example, SKUs may be classified as fast demand, medium demand and slow demand; and then a Mean Field is created with a certain percentage of SKUs belonging to fast demand classification, and a certain percentage belonging to medium demand classification, and so on. The average probability of the "security measure" of this Mean Field is illustratively the same as the other Mean Fields.

An example of grouping and approximation to Fokker-Planck equations for probability propagation will now be described.

An example programmable classifier or group forming component 150 can have the following variables:
State/SKU (which can include Demand, Uncertainty Demand, Inventory, Uncertainty Inventory, Profit, Uncertainty Profit, Order), and Time horizon.

All SKUs can be classified into several classes according to rules 156, 158 of classification. The rules can be designed to be functions of state values, time horizon, etc. As briefly discussed above with respect to FIG. 2, an example of rules is to classify SKUs according to the range of average demand. There can illustratively be some overlap along the edge between two adjacent classes. For example, classify SKUs with average demand between 10 and 100 as one class, and SKUs with average demand between 90 and 200 as another class so that the two classes have overlap.

Mean Field clustering component 152 mixes the elements chosen from each class to form several Blocks. These Blocks can be measured as "similar" under a certain measurement, for example the weighted demand of each block is similar. Each Block is a Mean Field, which has its own Mean Field dynamics. The former forecaster, controller, etc. described above can be designed for single SKU, and it can be applied directly to each Mean Field.

In order to get the dynamics of each Mean Field, the sensor (or tracker) needs to be defined for each specific Mean Field. A sensor can be a "leading" SKU in the Block that capture the performance of the Mean Field, or a weighted mean of state of all SKUs, and so on.

To group SKUs from different classes into a single Block, the magnitude of the state and the time horizon of the grouped SKUs are normalized.

An example of cluster deconstruction component 174 receives a decision made for a single Block, and transfers it into decisions for individual SKUs grouped in that Block, to obtain deconstruction of a Block.

An example of modifications of the Mean Field controller for deconstruction is now discussed.

The states of the controller for the assortment planning application include demand, inventory, profit, order, and their respective uncertainties. They are denoted by a state vector y(t) and the dynamics of the controller are written as:

$$\dot{y}(t) = \Phi(y(t), v(t)) \qquad \text{Eq. 12}$$

and the criterion of the controller is:

$$\min \int_0^T \left(\frac{1}{2}(y(t)-\hat{y}(t))^T Q(y(t)-\hat{y}(t)) + v(t)^2 R\right) dt + \qquad \text{Eq. 13}$$
$$\frac{1}{2}(y(T)-\hat{y}(T))^T F(y(T)-\hat{y}(T)) + (y(T)-\hat{y}(T))^T H \quad (1)$$

where $\hat{y}(t)$ is the given tracking value.

First, the terminal cost in the criterion is transferred to the running cost (as discussed above with respect to block 290 in FIG. 6) by introducing a new state variable w(t). Define $$w(t) = \tfrac{1}{2}(y(t)-\hat{y}(T))^T F(y(t)-\hat{y}(T)) + (y(t)-\hat{y}(T))^T H \qquad \text{Eq. 14}$$

and let the initial condition be a constant, $$w(0) = \tfrac{1}{2}(y(0)-\hat{y}(T))^T F(y(0)-\hat{y}(T)) + (y(0)-\hat{y}(T))T_H. \qquad \text{Eq. 15}$$

Then the terminal cost in Eq. 13 is replaced by $w(T) = \int_0^T \dot{w}(t)dt - w(0)$, and the criterion in Eq. 13 is rewritten as $$\min \int_0^T (\tfrac{1}{2}(y(t)-\hat{y}(t))^T Q(y(t)-\hat{y}(t)) + v(t)^2 R + \dot{w}(t))dt. \qquad \text{Eq. 16}$$

Since $$\dot{w}(t) = ((y(t)-\hat{y}(T))^T F + H)\dot{y}(t) = ((y(t)-\hat{y}(T))^T F + H)\Phi(y(t), v(t)), \qquad \text{Eq. 17}$$

the criterion in Eq. 14 is further rewritten as $$\min \int_0^T \left(\frac{1}{2}(y(t)-\hat{y}(t))^T Q(y(t)-\hat{y}(t)) + \qquad \text{Eq. 18}\right.$$
$$\left. v(t)^2 R + ((y(t)-\hat{y}(T))^T F + H)\Phi(y(t), v(t))\right) dt$$

Next, consider a particular interval $[t_i, t_{i+1})$, and assume that $y(t_i)$ and $v(t_i)$, are known. Then use them to find the solution with perturbation equations for y(t) and v(t), $$y(t) = y(t_i) + \delta y(t), v(t) = v(t_i) + \delta v(t) \qquad \text{Eq. 19}$$

The dynamics are approximated (as in a block 292 of FIG. 6 above) and written as $$\delta \dot{y}(t) = \Phi(y(t_i) + \delta y(t), v(t_i) + \delta v(t)) \qquad \text{Eq. 20}$$
$$\delta \dot{y}(t) \approx \left.\frac{\partial \Phi}{\partial y}\right|_{y(t_i),v(t_i)} \delta y(t) + \left.\frac{\partial \Phi}{\partial v}\right|_{y(t_i),v(t_i)} \delta v(t).$$

where the approximation is in the Dirac sense.
The criterion in this particular interval $[t_i, t_{i+1})$ is $$\min \int_{t_i}^{t_{i+1}} \left(\frac{1}{2}(y(t_i) + \delta y(t) - \hat{y}(t))^T Q(y(t_i) + \delta y(t) - \hat{y}(t)) + \qquad \text{Eq. 21}\right.$$
$$(v(t_i) + \delta v(t))^2 R +$$
$$\left.((y(t_i) + \delta y(t) - \hat{y}(T))^T F + H)\Phi(y(t_i) + \delta y(t), v(t_i) + \delta v(t))\right)dt$$

which is rewritten as $$\min \int_{t_i}^{t_{i+1}} \left(\frac{1}{2}(\delta y(t) - (\hat{y}(t) - y(t_i)))^T Q(\delta y(t) - (\hat{y}(t) - y(t_i))) + \qquad \text{Eq. 22}\right.$$
$$(v(t_i) + \delta v(t))^2 R + ((\delta y(t) - (\hat{y}(t) - y(t_i)))^T F + H)$$
$$\left.\Phi(y(t_i) + \delta y(t), v(t_i) + v(t))\right)dt.$$

The quadratic tracking criterion appears as a consequence of linearizing in the Dirac sense.

Next, transform (as indicated at block 294 in FIG. 6 above) the problem from the time interval $t \in [t_i, t_{i+1}]$ to a fixed time interval $\tau \in [0, 1]$ by introducing a clock variable $$u_c(\tau) = \frac{dt}{d\tau} = t_{i+1} - t_i.$$

Then $$\frac{dy}{dt} = \Phi(y(t), v(t)) \text{ and}$$
$$\frac{dy}{d\tau} = \frac{dy}{dt}\frac{dt}{d\tau} = \Phi(y(t), v(t))u_c(\tau).$$

Then a criterion with a quadratic-affine terminal term is converted to a linear constant terminal term (as indicated at block 296 in FIG. 6 above), by introducing a new state variable and adding a running cost term.

This can be done as follows:

Terminal Cost: $\tfrac{1}{2}(x(T)-Y(T))^T F(x(T)-Y(T)) + (x(T)-Y(T))^T H \qquad \text{Eq. 23}$ Define: $w(t) = \tfrac{1}{2}(x(t)-Y(T))^T F(x(t)-Y(T)) + (x(t)-Y(T))^T H \qquad \text{Eq. 24}$ And then: $\dot{w}(t) = ((x(t)-Y(T))^T F + H)\dot{x}(t) \qquad \text{Eq. 25}$ Since $\dot{x}(t) = G(x(t), v(t))$, (1) is rewritten as:

$$\dot{w}(t) = ((x(t)-Y(T))^T F + H)G(x(t), v(t)) \qquad \text{Eq. 26}$$

and the terminal part of the criterion becomes simply:

$$w(T). \qquad \text{Eq. 27}$$

To generate the Mean Field controller with terminal time as a decision variable, an extra variable, called the clock, is added to the controller and the tracking problem is modified accordingly. Since the clock variable enters the modified tracking problem as a multiplier (the detail is shown below), the clock problem is solved separately from solving the modified LQ tracking problem.

The original tracking problem (in general form) is $$\min_{v,t_{i+1}} \int_{t_i}^{t_{i+1}} \frac{1}{2}(x(t) - y(t))^T Q(x(t) - y(t)) + \frac{1}{2}v(t)^T Rv(t) dt + \qquad \text{Eq. 28}$$
$$\frac{1}{2}(x(t_{i+1}) - y(t_{i+1}))^T F(x(t_{i+1}) - y(t_{i+1})) + (x(t_{i+1}) - y(t_{i+1}))^T H$$
$$\text{s.t. } \frac{dx(t)}{dt} = G(x(t), v(t))$$

with initial condition $x(t_i)$, where x(t) is the state, y(t) is the tracking value of the state, v(t) is the control variable, $t_i$ is the starting time, and $t_{i+1}$ is the terminal time.

The original tracking problem is modified to include the clock variable. The decision variables are both v(t) and $t_{i+1}$. The tracking values in y(t) are known before setting up the above problem and are kept constant in the time interval $[t_i, t_{i+1}]$, therefore, y(t) is denoted as $y(t_i^-)$ where the "−"

indicates that the tracking values are determined before setting up the tracking problem.

The original tracking problem is not a linear-quadratic tracking problem since the dynamic equation of x(t), that is, $G(x(t),v(t))$, is defined by rules and can be of any form. The equation is linearized by introducing incremental variables as follows. The modified problem is a linear-quadratic tracking problem according to Dirac, since it is an estimation of the original problem and the higher order terms are ignored.

Let $\delta x(t) = x(t) - x(t_i)$, and    Eq. 29

$\delta v(t) = v(t) - v(t_i)$.

Then $\delta \dot{x}(t) = \dot{x}(t)$.

Therefore $\delta \dot{x}(t) = G(\delta x(t) + x(t_i), \delta v(t) + v(t_i))$ $\approx G(x(t_i), v(t_i)) + \frac{\partial G}{\partial x}\bigg|_{(x(t_i),v(t_i))} \cdot$ $\delta x(t) + \frac{\partial G}{\partial v}\bigg|_{(x(t_i),v(t_i))} \cdot \delta v(t)$ And let $\delta y(t_i^-) = y(t_i^-) - x(t_i)$. Then use the following linear-quadratic tracking problem to estimate the original tracking problem $\min_{\delta v, t_{i+1}} \int_{t_i}^{t_{i+1}} \frac{1}{2} (\delta x(t) - \delta y(t_i^-))^T Q (\delta x(t) - \delta y(t_i^-)) +$    Eq. 30

$\frac{1}{2} \delta v(t)^T R \delta v(t) dt + \frac{1}{2} (\delta x(t_{i+1}) - \delta y(t_i^-))^T F (\delta x(t_{i+1}) - y(t_i^-)) +$ $(\delta x(t_{i+1}) - \delta y(t_i^-))^T H$ s.t. $\frac{d \delta x(t)}{dt} = A \cdot \delta x(t) + B \cdot \delta v(t) + f$ with initial condition $\delta x(t_i) = 0$,
where $A = \frac{\partial G}{\partial x}\bigg|_{(x(t_i),v(t_i))}$, and $B = \frac{\partial G}{\partial v}\bigg|_{(x(t_i),v(t_i))}$, and $f = G(x(t_i), v(t_i))$, by Dirac method.

Simplify the terminal term from the criterion of the tracking problem by adding an extra variable w(t)

$w(t) = \frac{1}{2} (\delta x(t) - \delta y(t_i^-))^T F (\delta x(t) - y(t_i^-)) + (\delta x(t) - \delta y(t_i^-))^T H$    Eq. 31 then $\frac{dw(t)}{dt} = ((\delta x(t) - \delta y(t_i^-))^T \cdot F + H^T) \cdot \delta \dot{x}(t)$    Eq. 32

$= ((\delta x(t) - \delta y(t_i^-))^T \cdot F + H^T) \cdot$ $(A \cdot \delta x(t) + B \cdot \delta v(t) + f)$ with initial condition $w(t_i) = \frac{1}{2}(\delta x(t_i) - \delta y(t_i^-))^T F (\delta x(t_i) - y(t_i^-)) + (\delta x(t_i) - \delta y(t_i^-))^T H$.    Eq. 33

The tracking value of the new variable w(t) is 0. Let $\tilde{x}(t) = \begin{bmatrix} \delta x(t) \\ w(t) \end{bmatrix}$, let $\tilde{y}(t_i^-) = \begin{bmatrix} \delta y(t_i^-) \\ 0 \end{bmatrix}$, let $\tilde{v}(t) = \delta v(t)$ and let $\tilde{Q} = \begin{bmatrix} Q & 0 \\ 0 & 0 \end{bmatrix}$.

Now, the linear quadratic tracking problem is written as, $\min_{\delta v, t_{i+1}} \int_{t_i}^{t_{i+1}} \frac{1}{2} (\tilde{x}(t) - \tilde{y}(t_i^-))^T \tilde{Q} (\tilde{x}(t) - \tilde{y}(t_i^-)) +$    Eq. 34

$\frac{1}{2} \tilde{v}(t)^T R \tilde{v}(t) dt + w(t_{i+1})$ s.t. $\frac{d \tilde{x}(t)}{dt} = \tilde{G}(\tilde{x}(t), \tilde{v}(t))$ with initial condition $\tilde{x}(t_i) = \begin{bmatrix} \delta x(t_i) \\ w(t_i) \end{bmatrix}$, where $\delta x(t_i) = 0$ and $w(t_i)$ is given above.
Also, $w(t_{i+1})$ is written as $[0 \ 1] \cdot \begin{bmatrix} \delta x(t) \\ w(t) \end{bmatrix} = \tilde{H}^T \cdot \tilde{x}(t_{i+1})$.

The time interval $[t_i, t_{i+1}]$ is mapped to a unit interval [0, 1] by introducing the clock variable and defining a clock dynamic equation as follows, $\frac{dt(\tau)}{d\tau} = u_c(\tau)$    Eq. 35 with $t(0) = t_i$, $t(1) = t_{i+1}$.

Let $\tilde{\tilde{x}}(\tau) = \begin{bmatrix} \tilde{x}(t(\tau)) \\ t(\tau) \end{bmatrix}$, and let $\tilde{\tilde{v}}(\tau) = \tilde{v}(t(\tau))$.

Converting to a new time $\tau$ yields, $$\frac{d\tilde{x}(t)}{dt} = \frac{d\tilde{x}(t(\tau))}{d\tau} \cdot \frac{d\tau}{dt} = \frac{d\tilde{x}(t(\tau))}{d\tau} \cdot \frac{1}{u_c(\tau)} \quad \text{Eq. 36}$$

that is, $$\frac{d\tilde{x}(t(\tau))}{d\tau} = u_c(\tau) \cdot \frac{d\tilde{x}(t)}{dt} = u_c(\tau) \cdot \tilde{G}(\tilde{x}(t(\tau)), \tilde{v}(\tau)). \quad \text{Eq. 37}$$

Therefore, the dynamics of $\tilde{\tilde{x}}(\tau)$ become $$\frac{d\tilde{\tilde{x}}(\tau)}{d\tau} = \begin{bmatrix} \frac{d\tilde{x}(t(\tau))}{d\tau} \\ \frac{dt}{d\tau} \end{bmatrix} \quad \text{Eq. 38}$$

$$= u_c(\tau) \cdot \begin{bmatrix} \tilde{G}(\tilde{x}(t(\tau)), \tilde{v}(t(\tau))) \\ 1 \end{bmatrix}$$

$$= u_c(\tau) \cdot \tilde{\tilde{G}}(\tilde{\tilde{x}}(\tau), \tilde{v}(\tau))$$

The criterion is modified as follows. Let $$\tilde{\tilde{y}}(t_i^-) = \begin{pmatrix} \tilde{y}(t_i^-) \\ 1 \end{pmatrix},$$

and let $$\tilde{\tilde{Q}} = \begin{bmatrix} \tilde{Q} & 0 \\ 0 & 0 \end{bmatrix}.$$

Replace t by $\tau$ and replace dt by $u_c(\tau) \cdot d\tau$ in the criterion, to get $$\min_{\tilde{v}, u_c(\tau)} \int_0^1 \left( \frac{1}{2}(\tilde{\tilde{x}}(\tau) - \tilde{\tilde{y}}(t_i^-))^T \tilde{\tilde{Q}}(\tilde{\tilde{x}}(\tau) - \tilde{\tilde{y}}(t_i^-)) + \frac{1}{2}\tilde{v}(\tau)^T R \tilde{v}(\tau) \right) \cdot u_c(\tau) \quad \text{Eq. 39}$$

$$d\tau + \tilde{w}(1)$$

$$\text{s.t.} \quad \frac{d\tilde{\tilde{x}}(\tau)}{d\tau} = u_c(\tau) \cdot \tilde{\tilde{G}}(\tilde{\tilde{x}}(\tau), \tilde{v}(\tau))$$

with initial condition $$\tilde{\tilde{x}}(0) = \begin{bmatrix} \delta x(0) \\ w(0) \\ t(0) \end{bmatrix} \text{ and } \tilde{\tilde{w}}(1) = [0 \; 1 \; 0] \cdot \begin{bmatrix} \delta x(1) \\ w(1) \\ t(1) \end{bmatrix} = \tilde{\tilde{H}}^T \cdot \tilde{\tilde{x}}(1).$$

The clock $u_c(\tau)$ is solved separately from solving the above tracking problem, that is, the above problem is solved with only $\tilde{\tilde{v}}$ as the decision variable, $$\min_{\tilde{v}} \int_0^1 \left( \frac{1}{2}(\tilde{\tilde{x}}(\tau) - \tilde{\tilde{y}}(t_i^-))^T \tilde{\tilde{Q}}(\tilde{\tilde{x}}(\tau) - \tilde{\tilde{y}}(t_i^-)) + \frac{1}{2}\tilde{v}(\tau)^T R\tilde{v}(\tau) \right) \cdot u_c(\tau) \quad \text{Eq. 40}$$

$$d\tau + \tilde{\tilde{H}}^T \cdot \tilde{\tilde{x}}(1)$$

$$\text{s.t.} \quad \frac{d\tilde{\tilde{x}}(\tau)}{d\tau} = u_c(\tau) \cdot \tilde{\tilde{G}}(\tilde{\tilde{x}}(\tau), \tilde{v}(\tau))$$

with initial condition $$\tilde{\tilde{x}}(0) = \begin{bmatrix} \delta x(0) \\ w(0) \\ t(0) \end{bmatrix}.$$

This procedure converts the Mean Field approximation algorithm with a variable time horizon to a Mean Field control problem with a known finite horizon [0,1].

The controller provides a solution with an affine form, such as $x(0)+\delta x(\tau)$, so that it can easily be incorporated into a feedback control using a Mean Field algorithm.

The approach starts with the original tracking problem, treats the terminal time as a decision variable, and transforms the problem into a fixed [0,1] time interval, and then linearizes around time 0.

To do this, start with the original tracking problem with nonlinear dynamics, and a quadratic criterion with a quadratic-affine terminal term.

The original tracking problem (in general form)

$$\min_{v, t_{i+1}} \int_{t_i}^{t_{i+1}} \frac{1}{2}(x(t) - y(t))^T Q(x(t) - y(t)) + \frac{1}{2} v(t)^T R v(t) dt + \quad \text{Eq. 41}$$

$$\frac{1}{2}(x(t_{i+1}) - y(t_{i+1}))^T F(x(t_{i+1})) - y(t_{i+1}) + (x(t_{i+1}) - y(t_{i+1}))^T H$$

$$\text{s.t.} \quad \frac{dx(t)}{dt} = G(x(t), v(t))$$

with initial condition $x(t_i)$, where $x(t)$ is the state, $y(t)$ is the tracking value of the state, $v(t)$ is the control variable, $t_i$ is the (known) starting time, and $t_{i+1}$ is the (unknown) terminal time.

It should be noted that the decision variables are both $v(t)$ and $t_{i+1}$. The tracking values in $y(t)$ are known before setting up the above problem. The approach treats them as constant in the time interval $[t_i, t_{i+1}]$, therefore $y(t)$ is set to $y(t_i^-)$ in the interval, where the "−" indicates that the tracking values are determined before the tracking problem is set up.

The original tracking problem is typically not a linear-quadratic tracking problem since the dynamic equation of $x(t)$, that is, $G(x(t),v(t))$, can be of any form defined by rules. The initial condition for $v(t)$ is the last value of $v$ in the previous interval, denoted $v(t_i^-)$.

This tracking problem is nonlinear. It computes an affine transformation relative to the initial value of the state at the beginning of the interval by introducing incremental variables as follows. The modified problem is a linear-quadratic tracking problem, which is an estimation of the original problem in the Dirac sense, since the higher order terms of the approximation are ignored.

Let $\delta \tilde{x}(\tau) = \tilde{x}(\tau) - \tilde{x}(0)$ and $\delta \tilde{v}(\tau) = \tilde{v}(\tau) - \tilde{v}(0)$. Also, let $\delta w(\tau) = \tilde{w}(\tau) - \tilde{w}(0)$. And, let $\delta \tilde{t}(\tau) = t(\tau) - t(0)$. Eq. 42

Taking the derivative yields, $\delta\dot{\tilde{x}}(\tau)=\dot{\tilde{x}}(\tau)$, and using a Dirac approximation, gives, $$\frac{d\delta\tilde{x}(\tau)}{d\tau} = \delta\dot{\tilde{x}}(\tau) = u_c(\tau)\cdot G(\delta\tilde{x}(\tau) + \tilde{x}(0), \delta\tilde{v}(\tau) + \tilde{v}(0)) \approx \qquad \text{Eq. 43}$$

$$u_c(\tau)\cdot\left(G(\tilde{x}(0), \tilde{v}(0)) + \frac{\partial G}{\partial\tilde{x}}\bigg|_{(\tilde{x}(0),\tilde{v}(0))}\cdot\delta\tilde{x}(\tau) + \frac{\partial G}{\partial\tilde{v}}\bigg|_{(\tilde{x}(0),\tilde{v}(0))}\cdot\delta\tilde{v}(\tau)\right) \text{ And,}$$

$$\frac{d\delta\tilde{w}(\tau)}{d\tau} = u_c(\tau)\cdot((\delta\tilde{x}(\tau) + \tilde{x}(0) - \tilde{y}(0))^T\cdot F + H^T)\cdot \qquad \text{Eq. 44}$$

$$G(\delta\tilde{x}(\tau) + \tilde{x}(0), \delta\tilde{v}(\tau) + \tilde{v}(0)) \approx$$

$$u_c(\tau)\cdot\Bigg(((\tilde{x}(0) - \tilde{y}(0))^T\cdot F + H^T)\cdot G(\tilde{x}(0), \tilde{v}(0)) +$$

$$F\cdot G(\tilde{x}(0), \tilde{v}(0))\Bigg]\cdot\delta\tilde{x}(\tau) +$$

$$((\tilde{x}(0) - \tilde{y}(0))^T\cdot F + H^T)\cdot\frac{\partial G}{\partial\tilde{x}}\bigg|_{(\tilde{x}(0),\tilde{v}(0))}\cdot\delta\tilde{x}(\tau) +$$

$$((\tilde{x}(0) - \tilde{y}(0))^T\cdot F + H^T)\cdot\frac{\partial G}{\partial\tilde{v}}\bigg|_{(\tilde{x}(0),\tilde{v}(0))}\cdot\delta\tilde{v}(\tau)\Bigg)$$

And, letting $\widetilde{u_c}(\tau)=u_c(\tau)-u_c(0)$, yields $$\frac{d\delta\tilde{t}(\tau)}{d\tau} = u_c(\tau) = \delta\widetilde{u_c}(\tau) + u_c(0). \qquad \text{Eq. 45}$$

Write the three dynamic equations in vector/matrix format, letting $$\tilde{\tilde{x}}(\tau) = \begin{bmatrix} \delta\tilde{x}(\tau) \\ \delta\tilde{w}(\tau) \\ \delta\tilde{t}(\tau) \end{bmatrix}.$$

Then $$\frac{d\tilde{\tilde{x}}(\tau)}{d\tau} = \begin{bmatrix} \delta\dot{\tilde{x}}(\tau) \\ \delta\dot{\tilde{w}}(\tau) \\ \delta\dot{\tilde{t}}(\tau) \end{bmatrix} = \tilde{A}\cdot\tilde{\tilde{x}}(\tau) + \tilde{B}\cdot\delta\tilde{v}(\tau) + \tilde{f} \qquad \text{Eq. 46}$$

where $$\tilde{A} = \begin{bmatrix} \frac{\partial G}{\partial\tilde{x}}\bigg|_{(\tilde{x}(0),\tilde{v}(0))} & 0 & 0 \\ F\cdot G(\tilde{x}(0), \tilde{v}(0)) + ((\tilde{x}(0) - \tilde{y}(0))^T\cdot F + H^T)\cdot & & \\ \frac{\partial G}{\partial\tilde{x}}\bigg|_{(\tilde{x}(0),\tilde{v}(0))} & 0 & 0 \\ 0 & 0 & 0 \end{bmatrix} \qquad \text{Eq. 47}$$

$$\tilde{B} = \begin{bmatrix} u_c(\tau)\cdot\frac{\partial G}{\partial\tilde{v}}\bigg|_{(\tilde{x}(0),\tilde{v}(0))} \\ u_c(\tau)\cdot((\tilde{x}(0) - \tilde{y}(0))^T\cdot F + H^T)\cdot\frac{\partial G}{\partial\tilde{v}}\bigg|_{(\tilde{x}(0),\tilde{v}(0))} \\ 0 \end{bmatrix} \text{ and} \qquad \text{Eq. 48}$$

$$\tilde{f} = \begin{bmatrix} u_c(\tau)\cdot G(\tilde{x}(0), \tilde{v}(0)) \\ u_c(\tau)\cdot((\tilde{x}(0) - \tilde{y}(0))^T\cdot F + H^T)\cdot G(\tilde{x}(0), \tilde{v}(0)) \\ u_c(\tau) \end{bmatrix} \qquad \text{Eq. 49}$$

The initial conditions are:

$$\tilde{\tilde{x}}(0) = \begin{bmatrix} \delta\tilde{x}(0) \\ \delta\tilde{w}(\tau) \\ \delta\tilde{t}(\tau) \end{bmatrix} = \begin{bmatrix} 0 \\ 0 \\ 0 \end{bmatrix} \qquad \text{Eq. 50}$$

and $\tilde{x}(0)=x(t_i)$, $\tilde{w}(0)=0$, $t(0)=t_i$, $\tilde{y}(0)=y(t_i^-)$, and $\tilde{v}(0)=v(t_i^-)$. Also, include upper and lower bounds on the clock, as:

$$u_{c_{min}} \leq u_c(\tau) \leq u_{c_{max}}. \qquad \text{Eq. 51}$$

The idea is to keep $u_c(\tau)$ constant for the regulator problem, and treat $u_c(\tau)$ as a variable in the non-regulator problem. The optimality conditions allow us to separate the solutions for $\delta\tilde{v}(\tau)$ and a bang-bang solution for $u_c(\tau)$ over a small time interval.

Now, the criterion of the problem is:

$$\int_0^1 \tfrac{1}{2}((\delta\tilde{x}(\tau)-\tilde{y}(1))^T Q(\delta\tilde{x}(\tau)-\tilde{y}(1))+(\delta\tilde{v}(\tau)-\tilde{v}(1)^2 R))d\tau + \delta\tilde{w}. \qquad \text{Eq. 52}$$

and note that this problem tracks the future $\tilde{y}(1)$, not the past. Also, the matrices $\tilde{A}$, $\tilde{B}$, $\tilde{f}$ are evaluated at the beginning of the interval and are held constant throughout the interval. This is possible by using the bang-bang structure of the clock $u_c(\tau)$ and determining whether it is at $u_{c_{min}}$ or $u_{c_{max}}$. It changes only once in the interval.

The Hamiltonian of the system is written as:

$$H = L(\delta\tilde{x}, \delta\tilde{w}, \delta\tilde{v}) + p(\tau)^T\frac{d\delta\tilde{x}(\tau)}{d\tau} + \lambda(\tau)\frac{d\delta\tilde{w}(\tau)}{d\tau} + \mu(\tau)\frac{d\delta\tilde{t}(\tau)}{d\tau} \qquad \text{Eq. 53}$$

where $$L(\delta\tilde{x}, \delta\tilde{w}, \delta\tilde{v}) = \qquad \text{Eq. 54}$$
$$\frac{1}{2}((\delta\tilde{x}(\tau) - \tilde{y}(1))^T Q(\delta\tilde{x}(\tau) - \tilde{y}(1)) + (\delta\tilde{v}(\tau) - \tilde{v}(1)^2 R)).$$

Claim: The algorithm performs a "quasi-separation", letting $$H_{LQT} = L(\delta\tilde{x}, \delta\tilde{w}, \delta\tilde{v}) + p(\tau)^T\frac{d\delta\tilde{x}(\tau)}{d\tau} + \lambda(\tau)\frac{d\delta\tilde{w}(\tau)}{d\tau} \qquad \text{Eq. 55}$$

and $$H_{clock} = \mu(\tau)\frac{d\delta\tilde{t}(\tau)}{d\tau}. \qquad \text{Eq. 56}$$

Then, solve for the co-states, $p(\tau)$, $\lambda(\tau)$, $\mu(\tau)$, using the terminal conditions $p(1)=0$ and $\lambda(1)=1$. The clock solution is a bang-bang solution, given by, if $H^*_{clock} < H_{clock}$ then $u_c(\tau) = u_{cmin}$ if $H^*_{clock} > H_{clock}$ then $u_c(\tau) = u_{cmax}$ $\qquad$ Eq. 57 and the switching time is when $$H^*_{clock} = H_{clock}. \qquad \text{Eq. 58}$$

An example of the procedure is to start with all of the SKUs and then use a classifier to assign SKUs to blocks based on rules. Assume the rules are provided by the user (such as, by demand levels, profit levels, uncertainty, etc.). The number of blocks are much smaller than the number of SKUs. Then Mean Field groups are created, using a few SKUs from the blocks. The characterization of the groups is used to define the Mean Field aggregators.

Each original SKU i is characterized by: time interval of activity $t_i, t_{i+1}$, G, nonlinear dynamics, parameters $Q^i$, $F^i$, $R^i$, $H^i$, clock limits, $u_{c_{min}}$ and $u_{c_{max}}$.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
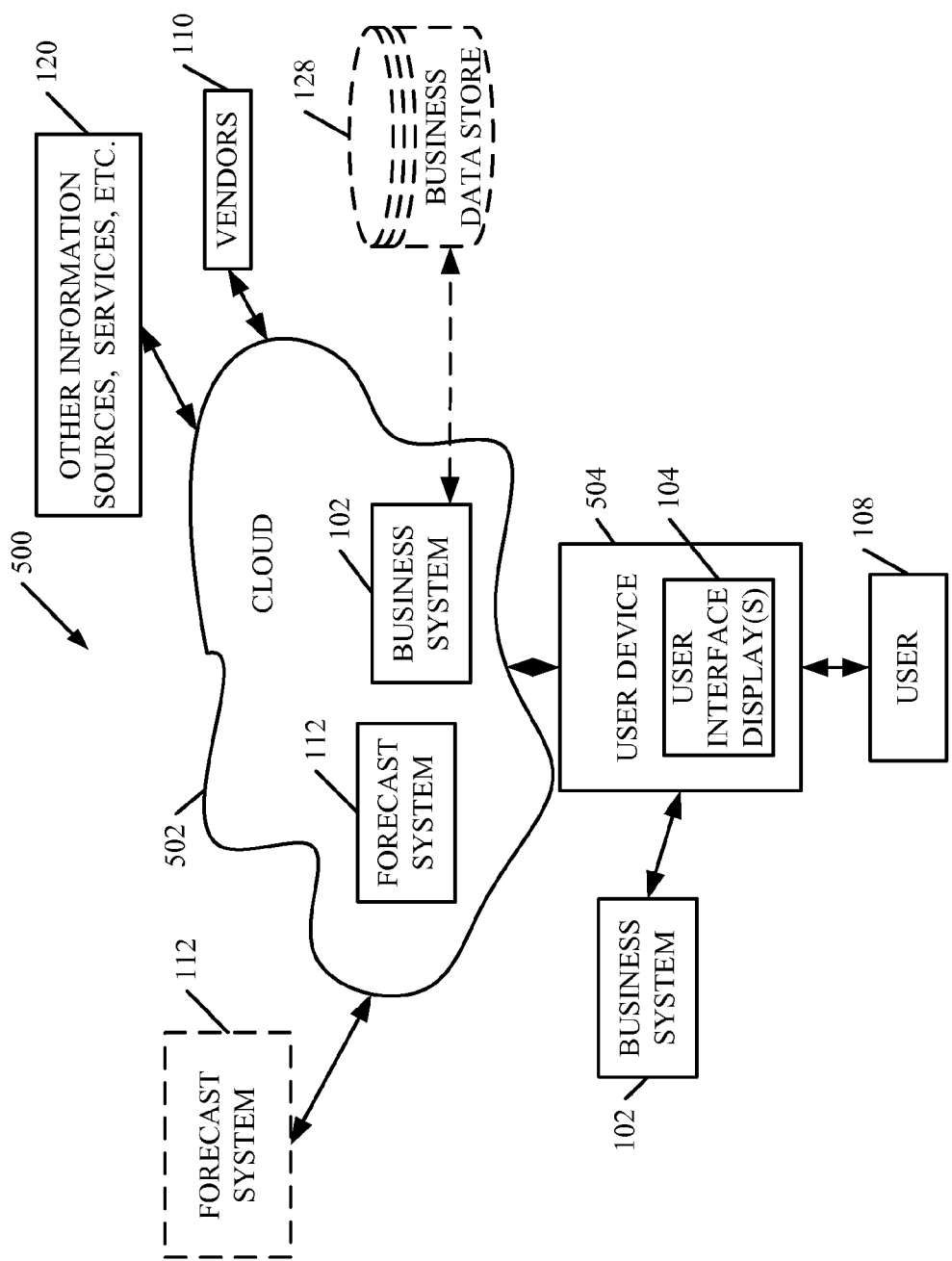
FIG. 7 is a block diagram showing one example of the architecture illustrated in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that business system 102 and forecast system 112 can be located in cloud 502 (which can be public, private, or a combination where portions are public while others are private). Therefore, user 108 uses a user device 504 to access those systems through cloud 502.

FIG. 7 also depicts another example of a cloud architecture. FIG. 7 shows that it is also contemplated that some elements of architecture 100 can be disposed in cloud 502 while others are not. By way of example, data store 128 can be disposed outside of cloud 502, and accessed through cloud 502. In another example, business system 102 can be an on premise system and forecast system 112 can be a cloud-based service or it can reside in another remote server location. It could be local to business system 102 as well. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
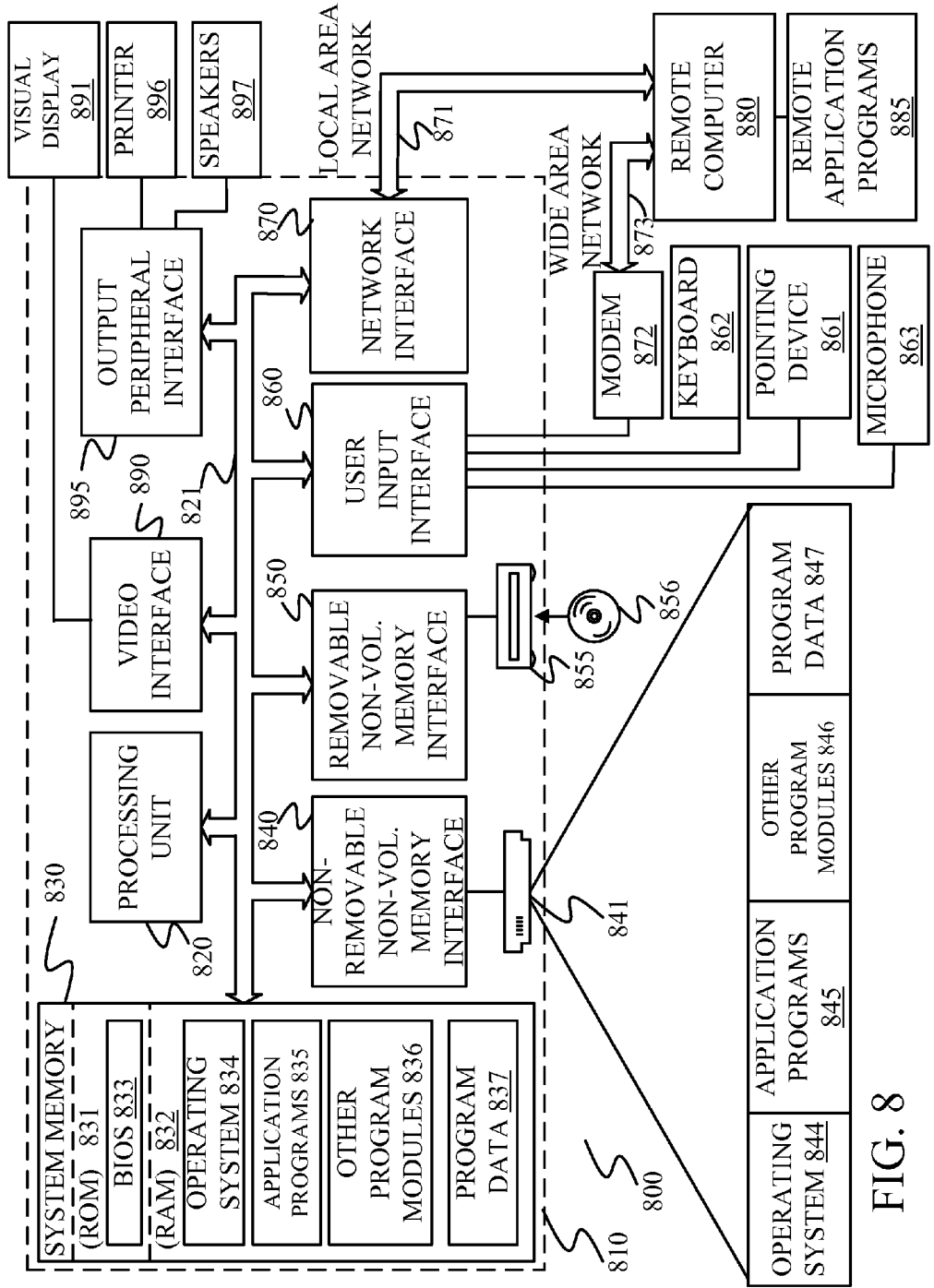
FIG. 8 is a block diagram of one example of a computing environment.

FIG. 8 is one embodiment of a computing environment in which architecture 100, or parts of it, (for example) can be deployed. With reference to FIG. 8, an exemplary system for implementing some embodiments includes a general-purpose computing device in the form of a computer 810. Components of computer 810 may include, but are not limited to, a processing unit 820 (which can comprise processor 124 or controller 268 or others), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein (such as that in cluster deconstruction component 174 or other items in forecast system 112) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a clustering component configured to generate a plurality of different clusters, each cluster having a membership of different data items, each data item representing a product in a system;

a cluster controller, corresponding to a given cluster, configured to identify a cluster tracker representative of the membership of the given cluster and to generate a cluster demand decision for the given cluster, indicative of a demand for the products represented in the cluster, as a whole, based on changes in the cluster tracker for the given cluster; and a cluster deconstruction component configured to receive the cluster decision and generate individual product demand decisions for each of the products represented by the data items in the membership of the cluster.

Example 2 is the computing system of any or all previous examples wherein the clustering component comprises a mean field clustering component, and wherein each cluster comprises a mean field.

Example 3 is the computing system of any or all previous examples wherein the system comprises a business system and further comprising:

a suggestion generator configured to generate product related suggestions based on the product demand decisions and output the product related suggestions to the business system.

Example 4 is the computing system of any or all previous examples and further comprising:

a group forming component configured to obtain the data items from the business system and generate a plurality of overlapping groups of data items based on a similarity metric.

Example 5 is the computing system of any or all previous examples wherein the clustering component is configured to receive the overlapping groups and generate the plurality of clusters so each cluster has data items from at least two of the overlapping groups.

Example 6 is the computing system of any or all previous examples wherein the suggestion generator comprises an order suggestion generator that generates order suggestions for each of the products based on the product demand decisions.

Example 7 is the computing system of any or all previous examples wherein the cluster deconstruction component comprises:

a mean field particle controller configured to generate the individual product demand decisions to include product demand values corresponding to each of the products represented by the data items in the membership of the cluster.

Example 8 is the computing system of any or all previous examples wherein the mean field particle controller is configured to generate the individual product demand decisions to include a demand uncertainty value for each of the product demand values, and a suggested order including an amount of the corresponding product to order and a timing for ordering the corresponding product.

Example 9 is the computing system of any or all previous examples wherein each data item represents a stock keeping unit (SKU) identifying a product in the business system and wherein the mean field particle controller is configured to generate each of the individual product demand decisions as a decision corresponding to an individual SKU.

Example 10 is the computing system of any or all previous examples wherein the cluster deconstruction component comprises:

a matching system that is configured to generate the individual product demand decisions based on a relationship between each data item in the membership of the cluster and the cluster tracker for the cluster.

Example 11 is the computing system of any or all previous examples wherein the matching system comprises a pareto matching system configured to generate the individual demand decisions by performing pareto equilibrium matching between the cluster tracker for the cluster and each of the data items in the membership of the cluster.

Example 12 is a method, comprising:

generating a plurality of different clusters, each cluster having a membership of different data items, each data item representing a product in a system;

generating a cluster demand decision for a given cluster, indicative of a demand for products represented by the data items in the cluster, as a whole, based on changes in a cluster tracker for the given cluster; and generating individual product demand decisions for each of the products represented by the data items in the membership of the given cluster based on a relationship between each of the data items in the membership of the given cluster and the cluster tracker for the given cluster.

Example 13 is the method of any or all previous examples wherein generating a plurality of different clusters comprises:

generating the plurality of different clusters as mean field clusters.

Example 14 is the method of claim 13 and further comprising:

generating a plurality of groups of data items based on a similarity metric, at least some of the groups having overlapping memberships of data items that overlap with each other; and generating the plurality of clusters so each cluster has data items from at least two of the groups.

Example 15 is the method of any or all previous examples wherein generating individual product demand decisions comprises:

generating order suggestions for each of the products based on the individual product demand decisions.

Example 16 is the method of any or all previous examples wherein generating individual product demand decisions comprises:

performing pareto equilibrium matching between the cluster tracker for the cluster and each of the data items in the membership of the cluster.

Example 17 is the method of any or all previous examples wherein generating individual product demand decisions comprises:

generating the individual product demand decisions to include product demand values corresponding to each of the products represented by the data items in the membership of the cluster, a demand uncertainty value for each of the product demand values, and a suggested order including an amount of the corresponding product to order and a timing for ordering the corresponding product.

Example 18 is the method of any or all previous examples wherein each data item represents a stock keeping unit (SKU) identifying a product in a business system and wherein generating the individual product demand decisions comprises:

generating each of the individual product demand decisions as a decision corresponding to an individual SKU.

Example 19 is a computer readable storage medium storing computer executable instructions which, when executed by a computer, cause the computer to perform a method, comprising:

generating a plurality of different clusters, each cluster having a membership of different data items, each data item representing a product in a system;

identifying a cluster tracker representative of the membership of a given cluster;

generating a cluster demand decision for the given cluster, indicative of a demand for the products represented in the cluster, as a whole, based on changes in the cluster tracker for the given cluster; and generating individual product demand decisions for each of the products represented by the data items in the membership of the cluster based on the cluster demand decision.

Example 20 is the computer readable storage medium of any or all previous examples wherein generating individual product demand decisions comprises:

performing pareto equilibrium matching between the cluster tracker for the given cluster and each of the data items in the membership of the given cluster to obtain matching results; and generating the individual product demand decisions, based on the matching results, to include product demand values corresponding to each of the products represented by the data items in the membership of the given cluster, a demand uncertainty value for each of the product demand values, and a suggested order including an amount of the corresponding product to order and a timing for ordering the corresponding product.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the ins ructions, when executed, configure the computing system to provide:
   a mean field clustering component configured to generate a plurality of different mean field clusters, each mean field cluster having
      a membership of different data items, each data item representing a product associated with the computing system, and
      a mean field model with mean field dynamics corresponding to attributes of the products represented by the data items in the mean field cluster;
   a mean field cluster controller generator configured to generate a mean field cluster controller for each of the plurality of mean field clusters, each mean field cluster controller configured to:
      for a corresponding mean field cluster in the plurality of mean field clusters,
         determine a mean of state values for all data items in the corresponding mean field cluster;
         based on the determined mean, select one of the data items in the corresponding mean field cluster as a single cluster tracker representative of the membership of the data items in the corresponding mean field cluster;
         monitor demand information associated with the single cluster tracker to determine a change in the mean field dynamics associated with the corresponding mean field cluster; and
         based on the determined change, generate a single cluster demand decision that is:
            associated with the corresponding mean field cluster, and
            indicative of a collective demand for the products represented by the data items in the corresponding mean field cluster;
   a cluster deconstruction component configured to:
      for each mean field cluster in the plurality of mean field clusters,
         receive the single cluster demand decision that corresponds to the mean field cluster;
         generate a clock variable that represents a temporal boundary corresponding to product demand decision generation; and
         for each data item in the mean field cluster,
            generate a state variable for the data item using pareto equilibrium matching based on a relationship between the data item and the single cluster tracker for the mean field cluster, and
            generate an individual product demand decision for the product represented by the data items in the mean field cluster based on the state variable and the clock variable; and
   a control system configured to:
      generate a control instruction that instructs an electronic product system to perform an action based on the individual product demand decisions for each of the products.

2. The computing system of claim 1 wherein the mean field dynamics are time-varying.

3. The computing system of claim 1, wherein the cluster deconstruction component comprises a plurality of cluster deconstruction components in a distributed processing environment, each cluster deconstruction component corresponding to a particular one of the mean field clusters and configured to:
   receive the single cluster demand decision that corresponds to the particular mean field cluster; and
   generate individual product demand decisions for each of the products represented by the data items in the particular mean field cluster.

4. The computing system of claim 1 and further comprising:
   a group forming component configured to obtain the data items and generate a plurality of overlapping groups of data items based on a similarity metric.

5. The computing system of claim 4 wherein the mean field clustering component is configured to receive the overlapping groups and generate the plurality of clusters so each cluster has data items from at least two of the overlapping groups.

6. The computing system of claim 3 wherein at least two of the plurality of cluster deconstruction components are configured to, in parallel, receive the respective cluster demand decisions and generate the respective product demand decisions.

7. The computing system of claim 1 wherein the cluster deconstruction component comprises:
   a mean field particle controller configured to generate the individual product demand decisions to include product demand values corresponding to each of the products represented by the data items in the membership of the cluster.

8. The computing system of claim 7 wherein the mean field particle controller is configured to generate the individual product demand decisions to include a suggested order including an amount of the corresponding product to order and a timing for ordering the corresponding product.

9. The computing system of claim 8 wherein each data item represents a stock keeping unit (SKU) identifying a product and wherein the mean field particle controller is configured to generate each of the individual product demand decisions as a decision corresponding to an individual SKU.

10. A computer-implemented method, comprising:
generating a plurality of different mean field clusters, each mean field cluster having
a membership of different data items, each data item representing a product associated with a computing system, and
a mean field model with mean field dynamics corresponding to attributes of the products represented by the data items in the mean field cluster;
generating a mean field cluster controller for each of the plurality of mean field clusters, each mean field cluster controller corresponding to one of the mean field clusters and configured to:
for the corresponding mean field cluster,
determining a mean of state values for all data items in the corresponding mean field cluster;
based on the determined mean, selecting one of the data items in the corresponding mean field cluster as a single cluster tracker representative of the membership of the data items in the corresponding mean field cluster;
monitoring demand information associated with the single cluster tracker to determine a change in the mean field dynamics associated with the corresponding mean field cluster; and
based on the determined change, generating a single cluster demand decision that is:
associated with the corresponding mean field cluster, and
indicative of a collective demand for products represented by the data items in the corresponding mean field cluster;
for each mean field cluster in the plurality of mean field clusters,
determining relationships between each data item in the mean field cluster and the single cluster tracker for the mean field cluster; and
based on the single cluster demand decision that corresponds to the mean field cluster,
generating an individual product demand decision for each respective product by performing pareto equilibrium matching based on the determine relationship between the single cluster tracker for the mean field cluster and the data item that represents the respective product; and
generating a control instruction that instructs an electronic product control system to perform an action based on the individual product demand decisions for each of the products.

11. The method of claim 10 wherein the mean field dynamics are time-varying.

12. The method of claim 10 and further comprising:
generating a plurality of groups of data items based on a similarity metric, wherein at least two of the groups having overlapping memberships of data items that overlap with each other; and
generating the plurality of clusters so each cluster has data items from the at east two groups.

13. The method of claim 10 wherein generating individual product demand decisions comprises:
generating order suggestions for each of the products based on the individual product demand decisions.

14. The method of claim 12 wherein generating individual product demand decisions comprises:
generating the individual product demand decisions to include product demand values corresponding to each of the products represented by the data items in the membership of the cluster and a suggested order including an amount of the corresponding product to order and a timing for ordering the corresponding product.

15. The method of claim 14 wherein each data item represents a stock keeping unit (SKU) identifying a product in a business system and wherein generating the individual product demand decisions comprises:
generating each of the individual product demand decisions as a decision corresponding to an individual SKU.

16. A computing system comprising:
a processor; and
memory storing instructions executable by the processor, wherein the instructions, when executed, configure the computing system to:
generate a plurality of different mean field clusters, each mean field cluster having
a membership of different data items, each data item representing a product associated with the computing system, and
a mean field model with mean field dynamics corresponding to attributes of the products represented by the data items in the mean field cluster;
generate a mean field cluster controller for each of the plurality of mean field clusters, each mean field cluster controller corresponding to one of the mean field clusters and configured to:
for the corresponding mean field cluster,
determine a mean of state values for all data items in the corresponding mean field cluster;
based on the determined mean, select one of the data items in the corresponding mean field cluster as a single cluster tracker representative of the membership of the data items in the corresponding mean field cluster;
monitor demand information associated with the single cluster tracker to determine a change in the mean field dynamics associated with the corresponding mean field cluster; and
based on the determined change, generate a single cluster demand decision that is
associated with the corresponding mean field cluster, and
indicative of a collective demand for the products represented by the data items in the corresponding mean field cluster;
for each mean field cluster in the plurality of mean field clusters,
determine relationships between each data item in the mean field cluster and the single cluster tracker for the mean field cluster; and
based on the single cluster demand decision that corresponds to the mean field cluster, generate an individual product demand decision for each respective product based on the determined relationship between the data item that represents the respective product and the single cluster tracker for the mean field cluster; and generate a control instruction that instructs an electronic product control system to perform an action based on the individual product demand decisions for each of the products.

17. The computing system of claim 16 wherein the instructions configure the computing system to:

perform pareto equilibrium matching between the cluster tracker for the given cluster and each of the data items in the membership of the given cluster to obtain matching results; and generate the individual product demand decisions, based on the matching results, to include product demand values corresponding to each of the products represented by the data items in the membership of the given cluster and a suggested order including an amount of the corresponding product to order and a timing for ordering the corresponding product.

* * * * *